United States Patent
Sohn et al.

(10) Patent No.: US 9,819,870 B2
(45) Date of Patent: Nov. 14, 2017

(54) PHOTOGRAPHING METHOD AND ELECTRONIC DEVICE

(71) Applicant: Samsung Electronics Co., Ltd., Suwon-si, Gyeonggi-do (KR)

(72) Inventors: Jae-Sik Sohn, Suwon-si (KR); Ki-Huk Lee, Suwon-si (KR); Sang-Hyeon Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 14/837,617

(22) Filed: Aug. 27, 2015

(65) Prior Publication Data

US 2016/0065856 A1    Mar. 3, 2016

(30) Foreign Application Priority Data

Aug. 29, 2014  (KR) .................. 10-2014-0114394

(51) Int. Cl.
*H04N 5/232* (2006.01)

(52) U.S. Cl.
CPC ..... *H04N 5/23293* (2013.01); *H04N 5/23219* (2013.01); *H04N 5/23222* (2013.01); *H04N 5/23229* (2013.01); *H04N 5/23238* (2013.01)

(58) Field of Classification Search
CPC ........... H04N 5/23293; H04N 5/23219; H04N 5/23229; H04N 5/23222; H04N 5/23238
See application file for complete search history.

(56) References Cited

U.S. PATENT DOCUMENTS

| 8,749,646 B2* | 6/2014 | Mitsunaga | H04N 5/23248 348/208.6 |
| 2005/0168594 A1 | 8/2005 | Larson | |
| 2005/0276596 A1* | 12/2005 | Chan | H04N 5/23293 396/296 |
| 2009/0115857 A1* | 5/2009 | Li | H04N 5/23248 348/208.1 |
| 2009/0153685 A1 | 6/2009 | Son et al. | |
| 2010/0225782 A1 | 9/2010 | Sambongi | |
| 2010/0321470 A1 | 12/2010 | Oshima | |
| 2011/0115927 A1 | 5/2011 | Jang | |
| 2011/0242361 A1* | 10/2011 | Kuwahara | A63F 13/10 348/231.4 |

(Continued)

FOREIGN PATENT DOCUMENTS

| JP | 2005-223905 A | 8/2005 |
| KR | 10-2005-0066183 A | 6/2005 |

(Continued)

OTHER PUBLICATIONS

Nguyen, Huawei Ascend Mate 2 Review, Android Authority, Jul. 7, 2014, http://www.androidauthority.com/huawei-ascend-mate-2-review-400966/.

*Primary Examiner* — Mekonnen Dagnew
(74) *Attorney, Agent, or Firm* — Jefferson IP Law, LLP

(57) ABSTRACT

A photographing method is provided. The photographing method includes photographing, by an electronic device, a plurality of images through a photographing module functionally connected to the electronic device, providing a photographing guide associated with a validity of at least one photographed image during the photographing of the plurality of images, and generating a single image using the at least one photographed image.

19 Claims, 18 Drawing Sheets

(56) References Cited

U.S. PATENT DOCUMENTS

| | | |
|---|---|---|
| 2012/0133746 A1 | 5/2012 | Bigioi et al. |
| 2013/0010137 A1 | 1/2013 | Kawai |
| 2013/0141524 A1 | 6/2013 | Karunamuni et al. |
| 2015/0042852 A1* | 2/2015 | Lee .................... H04N 5/2258 |
| | | 348/262 |

FOREIGN PATENT DOCUMENTS

| | | |
|---|---|---|
| KR | 10-2006-0059302 A | 6/2006 |
| KR | 10-2012-0021666 A | 3/2012 |
| KR | 10-1409653 B1 | 6/2014 |
| WO | 2013/085512 A1 | 6/2013 |

* cited by examiner

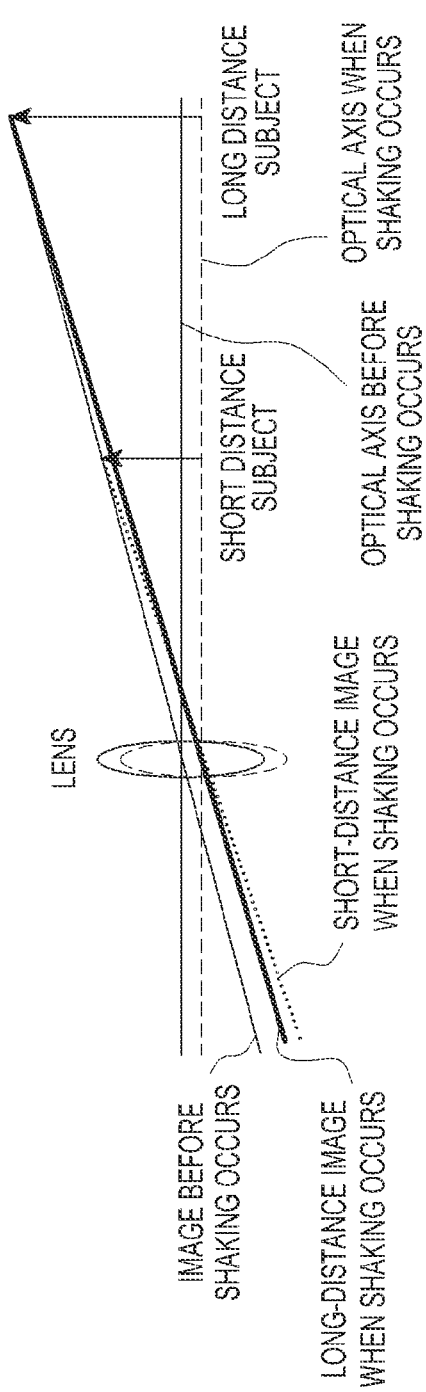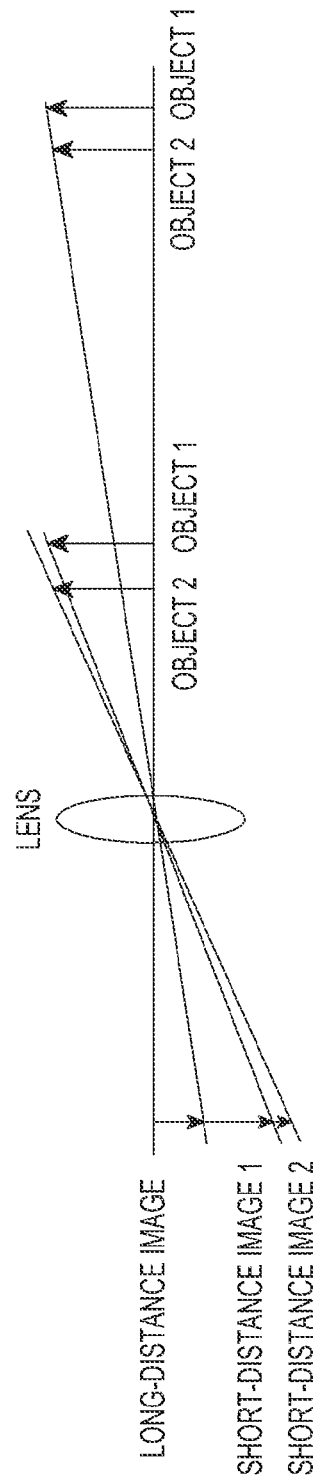
FIG. 1
FIG. 2

PHOTOGRAPHING METHOD AND ELECTRONIC DEVICE

CROSS-REFERENCE TO RELATED APPLICATION(S)

This application claims the benefit under 35 U.S.C. §119(a) of a Korean patent application filed on Aug. 29, 2014 in the Korean Intellectual Property Office and assigned Serial number 10-2014-0114394, the entire disclosure of which is hereby incorporated by reference.

TECHNICAL FIELD

The present disclosure relates to a photographing method that obtains a single image through multiple photographs, and an electronic device that obtains a single image through multiple photographs.

BACKGROUND

Recently, as various functions of portable electronic devices (for example, a smart phone, a tablet personal computer (PC), or the like) have developed, electronic devices including a photographing device have been widely used. Also, as demands of users for various high performance capabilities have increased, development of photographing devices and functions that satisfy user demands has accelerated.

A photographing function that obtains a single image using photographs requires a movement of a photographing device and thus, a user may need to perform complex and relatively accurate operations, when compared to a general photographing function.

The above information is presented as background information only to assist with an understanding of the present disclosure. No determination has been made, and no assertion is made, as to whether any of the above might be applicable as prior art with regard to the present disclosure.

SUMMARY

As a photographing function for obtaining a single image by composing images photographed through multiple times of photographing or appropriately combining them, a panoramic photographing function or a three dimensional (3D) scan photographing function is provided. The panoramic photographing function acquires an image with a wide view angle using a photographing device (and an electronic device equipped with the same, such as a smart phone or a digital camera) that has a limited view angle. When a photographing device captures a panoramic photograph, the photographing device obtains a plurality of images by moving (rotating) in the horizontal or vertical direction, and acquires an image with a wide view angle by combining the obtained images into a single image. When the above described panoramic photo is photographed by moving in the horizontal direction, the photo may have a ratio with a long width.

The 3D scan photographing function is a recently proposed technology to provide a 3D scanner function through a general portable electronic device including a photographing device. The 3D scan photographing function extracts feature points from a plurality of two dimensional (2D) images that are consecutively photographed, matches the extracted feature points, and generates a single 3D image.

Generally, panoramic photographing is used for photographing a wide area that requires a wide view angle, and accordingly, the function has been developed by taking into consideration the long distance photographing such as a landscape picture. However, the panoramic photographing function may also be useful for the short distance photographing and in a so called 'self-shot'.

The short distance photographing may have a high probability of having motion blur, which is caused when a photographing device shakes or a subject moves, when compared to photographing a distant subject, such as, a landscape picture or the like. Also, the short distance photographing may have a high probability of having an optical distortion of a subject when compared to the long distance photographing.

3D scan photographing executes relatively short distance photographing, and may have an accurate scan result when a distance between a subject and a photographing device and a location are accurately maintained. Accordingly, similar to the panoramic photographing function, when the 3D scan photographing function is executed, a distance to the subject that is originally set for photographing should be accurately maintained and a shaking of the photographing device should be minimized.

Aspects of the present disclosure are to address at least the above-mentioned problems and/or disadvantages and to provide at least the advantages described below. Accordingly, an aspect of the present disclosure is to provide a photographing method for obtaining a single image using multiple times of photographing, such as a panoramic photographing function or a 3D scan photographing function, which is appropriate for the short distance photographing, and an apparatus thereof. Particularly, various embodiments of the present disclosure provide a guide to improve the usability when photographing is executed to obtain a single image using multiple times of photographing, and to minimize the deterioration of quality of a finally obtained single image.

In accordance with an aspect of the present disclosure, a photographing method is provided. The photographing method includes photographing, by an electronic device, a plurality of images through a photographing module that is functionally connected to the electronic device, providing a photographing guide associated with a validity of at least one photographed image during the photographing of the plurality of images, and generating a single image using the at least one photographed image.

The photographing guide may include a message or a graphic guide material including information associated with the degree of motion blur or the degree of distortion, and the photographing guide may be displayed through a display which is functionally connected to the electronic device. For example, the electronic device may be a smart phone and the photographing module or the display may be applied to the smart phone or a smart watch.

In accordance with another aspect of the present disclosure, an electronic device is provided. The electronic device includes an image analyzing module configured to analyze a plurality of images photographed through a photographing module that is functionally connected to the electronic device, and that provides a photographing guide associated with a validity of at least one photographed image during the photographing of the plurality of images, and a display configured to display the photographing guide based on a control of the image analyzing module.

A photographing method for obtaining a single image using multiple photographs and an apparatus thereof according to various embodiments of the present disclosure may provide a guide to improve the usability, and to minimize the deterioration of quality of a finally obtained single image. The guide may report, to a user, distortion, shaking, or the like of a photographed image in real time, while capturing the photographs. Through the guide, the user may readily determine the suitability of a photographed image during photographing, and may easily determine whether to recapture the photograph or the like. This may resolve the inconveniences of a scheme of the related art that determines whether to execute re-photographing by checking a single image which is a final result after multiple photographs are completely captured.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 is a comparative diagram illustrating a difference between photographed images obtained through long-distance photographing and short-distance photographing while shaking a photographing device according to an embodiment of the present disclosure;

FIG. 2 is a comparative diagram illustrating a difference between photographed images obtained through long-distance photographing and short-distance photographing in association with a distance to a subject according to an embodiment of the present disclosure;

Throughout the drawings, it should be noted that like reference numbers are used to depict the same or similar elements, features, and structures.

DETAILED DESCRIPTION

Figure 3:
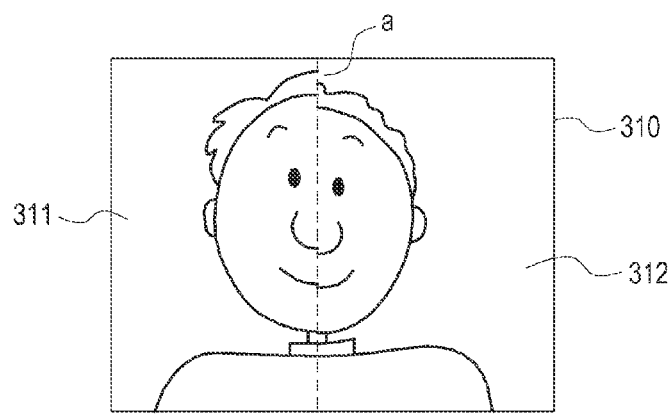
FIG. 3 is a diagram illustrating an example of photographed images that are obtained through panoramic photographing according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, operation, constituent element, element or a combination thereof, but may not be construed to exclude the existence of or a possibility of addition of one or more other characteristics, numbers, operations, constituent elements, elements or combinations thereof.

Furthermore, in the present disclosure, the expression "and/or" includes any and all combinations of the associated listed words. For example, the expression A and/or B may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be termed a second element, and similarly, a second element could be also termed a first element without departing from the scope of the present disclosure.

In the case where an element is referred to as being "connected" or "accessed" to other elements, it should be understood that not only the element is directly connected or accessed to the other elements, but also another element may exist between them. Meanwhile, in the case where an element is referred to as being "directly connected to" or "directly accessing' other elements, it should be understood that there is no element therebetween. The terms used in the present disclosure are only used to describe specific embodiments, and are not intended to limit the present disclosure.

Hereinafter, an electronic sensor according to various embodiments of the present disclosure will be described with reference to the accompanying drawings. A camera module including the electronic sensor according to various embodiments of the present disclosure, for example, an image sensor may be integral to an electronic device. Such an electronic device may be provided with a camera, a camcorder, a web camera, a surveillance camera, a medical camera, a high speed camera, a multi-camera such as a three dimensional (3D) camera, or the like.

The electronic device according to various embodiments of the present disclosure may include a device having a communication function. For example, the electronic device may include a combination of one or more devices such as a smart phone, a tablet personal computer (PC), a mobile phone, a video phone, an e-book reader, a desktop PC, a laptop PC, a net-book computer, a personal digital assistant (PDA), a portable multimedia player (PMP), an moving picture experts group (MPEG) audio layer 3 (MP3) player, a mobile medical device, a wearable device (e.g., a head-mounted-device (HMD) such as electronic glasses, electronic clothing, an electronic clock, a wrist watch, an electronic bracelet, an electronic necklace, an electronic appcessory, and a smart watch), a home appliance (e.g., a refrigerator, an air-conditioner, a vacuum cleaner, an oven, a microwave oven, a washing machine, an air cleaner, and the like), an artificial intelligence robot, a television (TV), a digital versatile disc (DVD) player, an audio, various medical devices (e.g., a magnetic resonance angiography (MRA), a magnetic resonance imaging (MRI), a computed tomography (CT), a movie camera, an ultrasonic device, and the like), a navigation device, a global positioning system (GPS) receiver, an event data recorder (EDR), a flight data recorder (FDR), a set-top box, a TV box (e.g., a Samsung Home-Sync™, an Apple TV™, or a Google TV™), an electronic dictionary, a vehicle infotainment device, electronic equipment for a ship (e.g., navigation equipment for a ship, a gyrocompass, and the like), an avionics, security equipment, electronic clothing, an electronic key, a camcorder, a game consoles, a flat panel display device, an electronic picture frame, an electronic album, furniture or a part of a building/structure including a communication function, an electronic board, an electronic signature receiving device, a projector, and the like. Also, an electronic device according to various embodiments of the present disclosure is not limited to the above described devices.

A photographing scheme for obtaining a single image through multiple photographs, according to various embodiments of the present disclosure, proposes a scheme that is more appropriate for the short-distance photographing. That is, a short distance panoramic photographing mode is proposed. Hereinafter, factors for the short-distance photographing mode in the present disclosure will be described with reference to the enclosed drawings. In this instance, although it is described that the photographing scheme according to various embodiments of the present disclosure is more proper to short-distance photographing, various embodiments of the present disclosure may be equivalently applied to the long-distance photographing, and may provide useful functions to other types of photography and image capture.

FIG. 1 is a comparative diagram illustrating a difference between photographed images obtained through long-distance photographing and short-distance photographing while shaking a photographing device according to an embodiment of the present disclosure.

Referring to FIG. 1, a movement distance of an image with respect to the same shaking of the photographing device may change on an image surface of the photographing device (i.e., a plane where an image is formed by a lens) based on a distance between a subject and the photographing device. For example, when a focus distance of a lens is 5 mm, a (short-distance) subject located within 1 m from the photographing device may generate a movement of 5 um on the image surface due to a photographing device's movement of 1 mm. In comparison, a (long-distance) subject located 10 m from the photographing device may generate a movement of 0.5 mm in association with the same movement of the photographing device. Therefore, as a subject is closer to the photographing device, a probability of obtaining an image including motion blur caused by shaking of the photographing device or a movement of a subject, becomes higher.

FIG. 2 is a comparative diagram illustrating a difference between photographed images obtained through long-distance photographing and short-distance photographing in association with a distance to a subject according to an embodiment of the present disclosure.

Referring to FIG. 2, an object that is close to the photographing device (and a lens thereof) has a larger variance in a size of an image formed on an image surface than an object that is relatively far. For example, as illustrated in FIG. 2, when object 1 and object 2 are relatively distant from the photographing device (and also, object 2 is a smaller than object 1 and is relatively closer to the photographing device), images of object 1 and object 2 may be formed on the image surface of the photographing device having substantially the same size.

However, when object 1 and object 2 are closer to the lens, the images are changed to short-distance image 2 for object 2 and short-distance image 1 for object 1, respectively. Even though object 2 is actually smaller than object 1, the short-distance image 2 is formed to be larger than the short-distance image 1 and thus, the ratio of object 1 and object 2 may be changed. This phenomenon may become a problem when a subject of which a relative ratio is important, such as a face or the like, is photographed. For example, when it is assumed that object 1 is an eye and object 2 is a nose, the eye and the nose are photographed to be similar in size through long-distance photographing, but the nose may be photographed to be larger than the eye through the short-distance photographing.

Referring to FIG. 1 and FIG. 2, the present disclosure provides a photographing function that may obtain a single image using multiple photographs, such as a panoramic photographing function or a 3D scan photographing function, by taking into consideration a short-distance photographing state. Hereinafter, the present disclosure will first be described from the perspective of panoramic photographing. In the following descriptions, although it is described that the present disclosure is applied to panoramic photographing or 3D scan photographing, the present disclosure may be applied to any photographing function used for generating a single image from multiple images.

FIG. 3 is a diagram illustrating an example of photographed images that are obtained through panoramic photographing according to an embodiment of the present disclosure.

Referring to FIG. 3, two images, that is, a first image 311 and a second image 312, are photographed respectively, and the images 311 and 312 are connected to each other along with a line indicated by 'a' so that a single panoramic picture 310 is obtained. Referring to FIG. 3, when the second image 312 is photographed, a distance between a photographing device and a subject (face) may become longer than when the first image 311 is photographed. Accordingly, a difference in an object's scale may occur between the first image 311 and the second image 312.

Referring to FIGS. 1 to 3, when panoramic photographing is executed according to various embodiments of the present disclosure, shaking of the photographing device or distortion of photographed images are additionally taken into consideration and thus, the present disclosure may provide an operation that is more appropriate for short-distance panoramic photographing. In this instance, various embodiments of the present disclosure may determine shaking of the photographing device and that the photographed images are distorted, and provide a guide associated with the validity of the photographed images through an appropriate image or sound. Accordingly, a user may immediately recognize the validity of a photographed image provided via the panoramic photograph function.

Generally, during the panoramic photograph function, an unintended movement (hand trembling) and a movement toward a wrong direction (moving out of a photographing guideline) may occur. In this instance, a quality of an image may be deteriorated, but the user may check a final result after panoramic photographing is completed. When a photographed image is displayed through a (relatively small) display screen, such as a portable electronic device including a photographing device or the like, while panoramic photographing is executed, there is difficulty in displaying the panoramic photographed images for the user to recognize the validity of the images. In comparison, various embodiments of the present disclosure immediately provide a guide associated with the validity of photographed images while panoramic photographing is executed, and thus, may improve the usability and may prevent or reduce the deterioration of the quality of a final panoramic picture.

Particularly, various embodiments of the present disclosure may enable panoramic photographing, even when a 'self-shot' function is used. The 'self-shot' function enables the user to photograph him/herself using a photographing device that may be installed in, for example, a front side (a side where a display is included) of a portable electronic device, and may provide the user with an image that is currently input through the photographing device, through a display screen so as to adjust a view angle and a composition during photographing.

The self-shot function is the short-distance photograph having a distance between the photographing device and a subject within 1 m. In the related art, it is difficult to consider a panoramic photographing function while the self-shot function is executed. For example, in the related art, a photographing device applied to a portable electronic device may include a relatively low-performance camera for the self-shot function, which is disposed on the front side (for example, a side where a display is included) of the corresponding electronic device, and a relatively high-performance camera for photographing normal pictures, which is disposed on the back side of the corresponding device. In this instance, the corresponding electronic device generally does not provide a panoramic photographing function while an image is photographed using the camera contained in the front side, that is, while the self-shot function is used.

In the case of photographing an image through the self-shot function, when it is assumed that a major axis view angle of the camera is about 65 degrees and the length of an arm of a photographer (i.e., the user) is 50 cm, the general size of a subject that a widely used electronic device is capable of containing in a display screen may be about 70 cm. This is not a large enough size for the user to also photograph a background and/or another user.

Therefore, various embodiments of the present disclosure provides a guide to enable appropriate panoramic photographing through the self-shot and enable panoramic photographing, and thus, the user may use the self-shot for photographing a plurality of persons, such as friends, family or the like.

Figure 4:
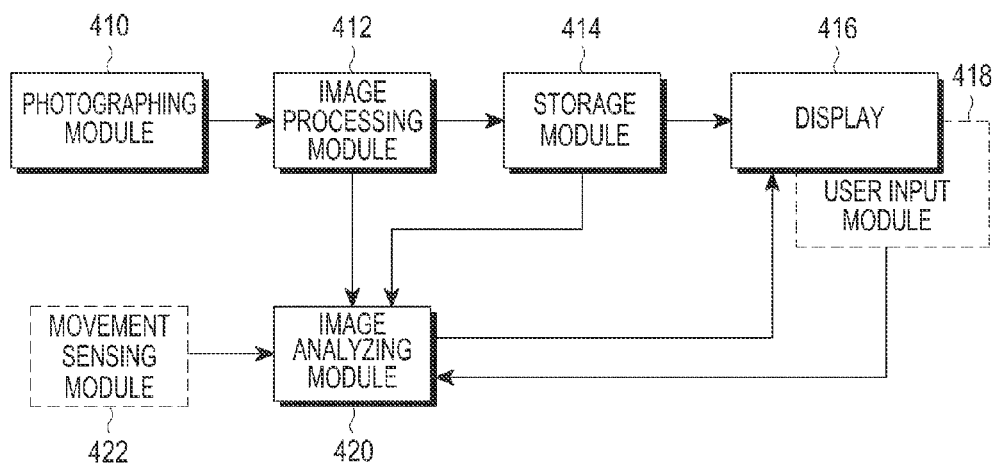
FIG. 4 is a block diagram of a panoramic photographing device according to various embodiments of the present disclosure.

FIG. 4 is a block diagram of a panoramic photographing device according to various embodiments of the present disclosure.

Referring to FIG. 4, the panoramic photographing device of FIG. 4 may include a photographing module 410, an image processing module 412, a storage module 414, a display 416, and an image analyzing module 420, and may additionally include a user input module 418 and a movement sensing module 422. The panoramic photographing device configured as described above, may be provided as a part of, for example, a portable electronic device.

The photographing module 410 may include a lens (not shown) for photographing a subject, an image sensor, and the like, to execute a general digital camera function, and particularly, may photograph a plurality of images for panoramic photographing, according to the present disclosure. The photographing module 410 may include an illumination sensor (not shown) for measuring illumination to appropriately set a photographing mode, a distance sensor for measuring a distance to a subject, or the like. Also, the photographing module 410 may be, for example, a front camera that is installed in the front side of the corresponding electronic device.

The image processing module 412 receives an electrical image signal (for example, Raw format data) obtained in the photographing module 410, executes various image processing functions (color interpolation, edge enhancement, noise reduction, or the like) to make an image be similar to a real subject, processes the image signal to be appropriate for screen characteristics of the display 416, and stores the image in the storage module 414.

The storage module 414 may store various pieces of information (for example, exif file, sensor supplementary information or the like) associated with image data and image processed in the image processing module 412.

The display 416 may receive image data stored in the storage module 414, and display photographing operations such as a live view during photographing, a photographed result, a photographing guide required for photographing, or the like.

The image analyzing module 420 controls general operations of a panoramic photographing operation, and analyzes motion blur information associated with distortion and shaking of a photographed image, determines the validity of the photographed image, and provides an appropriate photographing guide.

The movement sensing module 422 may include a gyro sensor, an acceleration sensor, or the like to sense a size and a direction of a movement of the photographing device, and may additionally include a component for detecting a size and a direction of a movement of a subject.

The user input module 418 may be provided in a touch input structure as a component for receiving an operation for photographing from a user. In this instance, the display 416 and the user input module 418 may be structurally configured as a single touch screen panel.

The image analyzing module 420 compares and analyzes input images (e.g., detects a change of features) to recognize a current rotation state of the photographing device. However, the rotation state of the photographing device may not be accurately detected through only the image analysis. For example, detecting or comparing features may be difficult when a photographed image has almost no features such as a picture of sky, or when the subject has repeated patterns, such as, a wallpaper. In this instance, the movement (rotation) state of the actual photographing device may be accurately detected using the movement sensing module 422.

For the same reason, stopping the movement (rotation) of the photographing device may be accurately detected by the movement sensing module 422. As described in the following descriptions, for example, the photographing device may be configured to execute photographing an image at a corresponding location when the photographing device stops while rotating. In this instance, when determining of the movement (rotation) of the photographing device is executed through only the image analysis, and a subject (for example, a face) continuously moves even in the case where the actual photographing device stops, it is difficult to accurately determine whether the photographing device stops. Therefore, the movement (rotation) state of the actual photographing device may be detected using the movement sensing module 422 so that the photographing device may execute photographing at a corresponding location when the actual photographing device stops. In this instance, when the movement sensing module 422 senses that the actual photographing device stops, the panoramic photographing device may be configured to analyze an input image of the corresponding location and to execute photographing when shaking or distortion is small.

Figure 5:
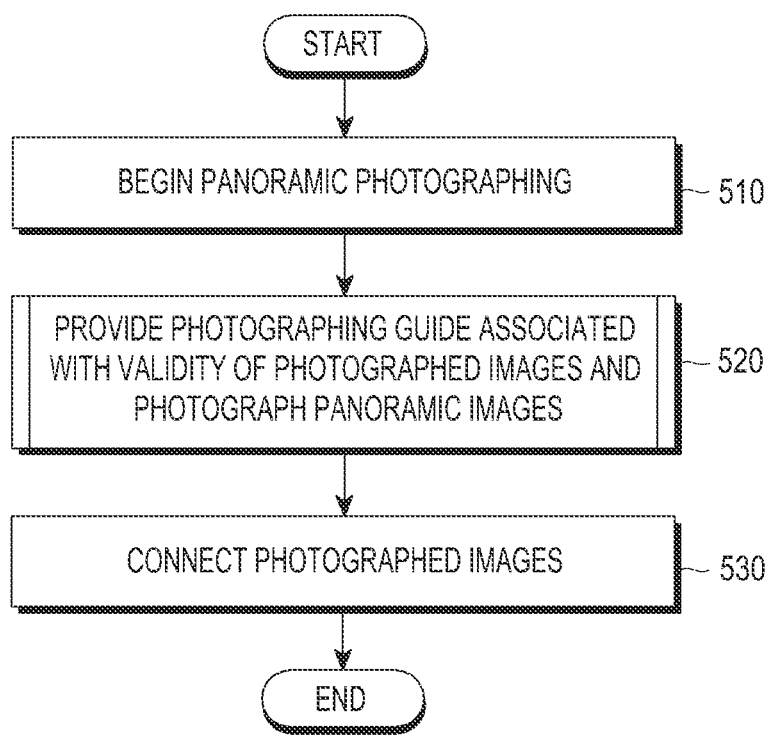
FIG. 5 is a flowchart illustrating a panoramic photographing method according to various embodiments of the present disclosure.

FIG. 5 is a flowchart illustrating a panoramic photographing method according to various embodiments of the present disclosure.

Referring to FIG. 5, the photographing device of FIG. 4 may execute a method of panoramic photographing that is, for example, implemented by the image analyzing module 420 that begins in operation 510. The operation may be executed when a panoramic photographing function is selected by a user from different photographing functions in the corresponding photographing device.

Subsequently, in operation 520, the method sequentially photographs a plurality of images forming a panoramic picture, and provides, in real time, a photographing guide associated with the validity of each of the photographed images. In this instance, the validity of each photograph image may be recognizing a quality of an image such as shaking, distortion, or the like. Also, the photographing guide may indicate an appropriate message or graphic guide material indicating information associated with shaking, distortion, or the like of an image. Also, the guide may be configured to provide an appropriate sound, vibration or the like, other than the graphic guide material (or together with the graphic guide material).

Subsequently, in operation 530, the method connects the photographed images. The connection operation adjusts a difference between the photographed images so as to naturally connect them as though they were a single picture. The adjustments of the photographed images includes correcting distortion, scaling a difference between subjects, stitching, blending, matching sizes between images, and the like.

Figure 6:
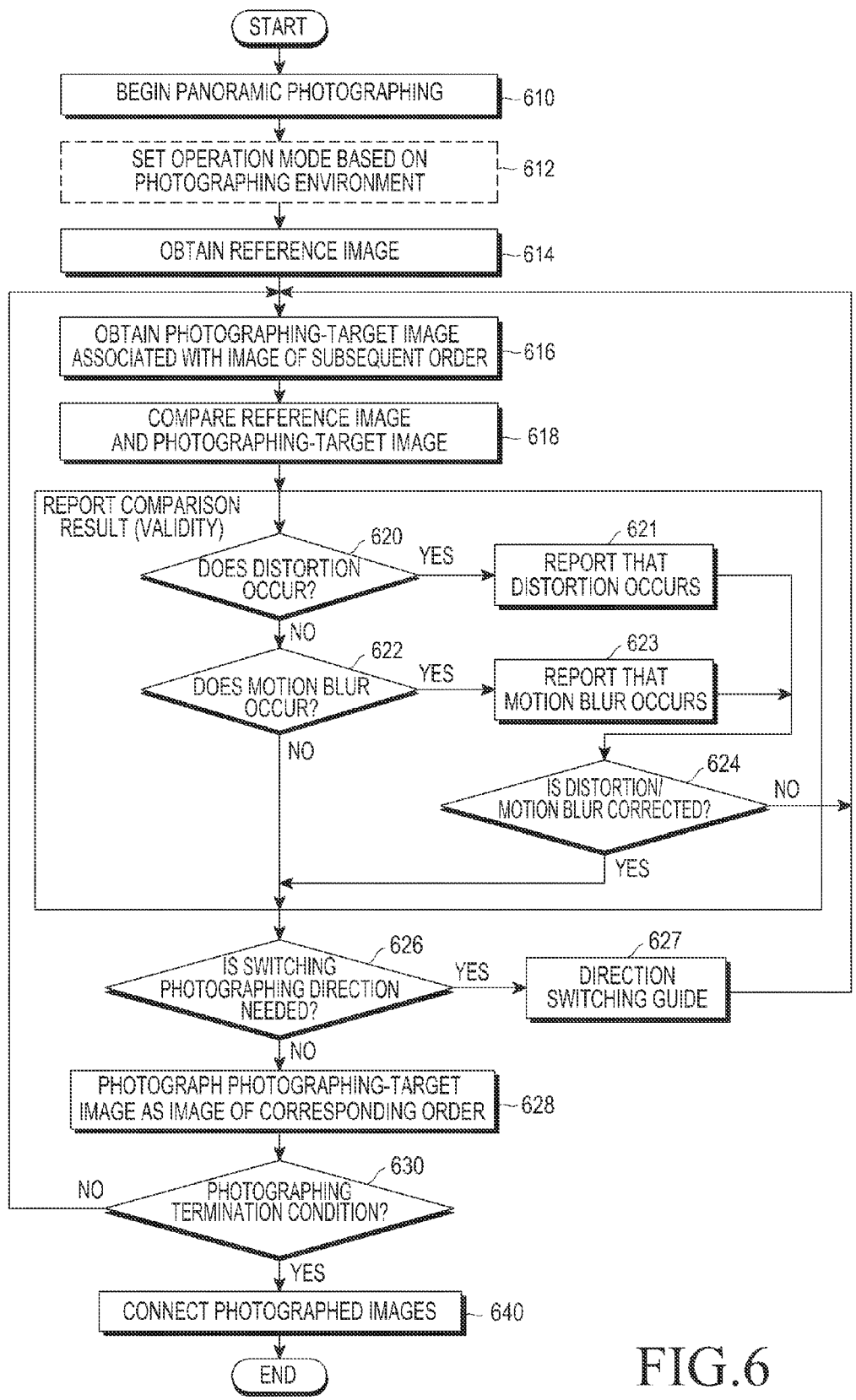
FIG. 6 is another flowchart illustrating a panoramic photographing method according to various embodiments of the present disclosure.

FIG. 6 is another flowchart illustrating a panoramic photographing method according to various embodiments of the present disclosure.

Referring to FIG. 6, which may be a more detailed implementation of the method of FIG. 5, panoramic photographing begins in operation 610. In operation 612, the method sets an operation mode appropriate for a photographing environment. For example, the operation mode of panoramic photographing may be classified into a 'burst shot mode' and a 'capture mode', and an appropriate operation mode may be set based on a current illumination or the like.

In operation 614, the method obtains a reference image. The reference image is a reference used for comparing subsequently photographed images, and may be, for example, an image that is obtained by photographing a subject including a user him/herself in the center when short-distance panoramic photographing is executed through a self-shot function. In this instance, to obtain an appropriate reference image, a guide may be provided to a user through a message or a graphic guide material.

In operation 616, the method obtains a photographing-target image associated with a subsequent order, based on a predetermined panoramic image photographing order. In this instance, an appropriate guide for photographing an appropriate subsequent image may be provided to the user. In this instance, the panoramic image photographing order may be set in advance, but the photographing order may be changed or may be set arbitrarily by taking user intention into consideration, similar to the general panoramic photographing scheme. In operation 618, the method compares the reference image and the photographing-target image. The comparison scheme may be determining whether distortion or motion blur exists in the photographing-target image.

In operations 620 to 624, the method reports a result (e.g., a validity) of the comparison between the reference image and the photographing-target image, through an appropriate guide. To determine the validity, in operation 620, distortion in the image is detected. When the distortion occurs, the method proceeds with operation 621 to provide distortion information to the user through an appropriate message or graphic guide material. In the same manner, the method determines whether motion blur is detected in operation 622. When the motion blur occurs, the method proceeds with operation 623 to provide motion blur information to the user through an appropriate guide. In this instance, when a degree of the distortion or motion blur is high, or when a terminal leaves a photographing route (i.e., the path of the terminal to obtain the image) by too far a distance, the method may provide a guide that requests termination of photographing or re-photographing, in operations 621 and 623. A guide that requests re-photographing may be configured to lead a movement of the corresponding photographing device to a location where re-photographing is needed.

The guide may include a message in a form of text or a graphic guide material, indicating information associated with the motion blur, distortion, a photographing route (and a state of leaving photographing route), or the like, provided through a display screen. Also, the guide may include generating a vibration or sound set in advance, to report a state associated with the motion blur, distortion, leaving of a photographing route, or the like. In this instance, at least two of a message, a graphic guide material, a vibration, a sound, and the like may be generated or configured together. Also, the guide may be generated through another device that is electrically connected (paired) with the current photographing device, as described in the following descriptions. Through the photographing guide provided through operations 621 and 623, a user may correct a photographing state. Accordingly, the method may determine whether the distortion or motion blur is corrected in operation 624, after executing operations 621 and 623. When the determination shows that the distortion or the motion blur is not corrected in operation 624, the method proceeds with operation 616 so as to repeat the described operation. When the distortion or motion blur is corrected, the method proceeds to operation 626.

When motion blur or distortion does not occur in operations 620 and 624, or when the degree of motion blur or distortion is insignificant and may be corrected, the method may proceed with operation 626 to photograph the photographing-target image as an image of a corresponding order.

In operation 626, the method determines whether switching of a photographing direction is required. If switching of the photographing direction is required, the method proceeds with operation 627 to provide a guide associated with switching a photographing direction when switching is needed, and proceeds with operation 628 when switching a photographing direction is not needed. For example, referring to FIG. 7, the method photographs a reference image when a panoramic photographing is executed according to an embodiment of the present disclosure, the method rotates the corresponding photographing device to the left and rotates the device again to the right to execute the entire photographing operation, as described in the following descriptions. As described above, the photographing direction of the corresponding photographing device may need to be switched appropriately when multiple photographs are captured. Referring back to FIG. 6, in operation 626, it is determined whether switching of a photographing direction is required. If switching of the photographing direction is not needed in operation 626, the method proceeds to operation 628 to continue photographing of the target image in corresponding order. After photographing the target image, the method proceeds to operation 630. In operation 630, it is determined whether a condition for terminating of the photographing exists. The photographing termination condition may be the case where images for a panoramic picture are all photographed, the case when an operation for terminating photographing is separately input, the case when a photographing device does not move (rotate) during a predetermined period of time and maintains a current posture, and the like. When the photographing termination condition does not exist, the method returns to operation 616 to continue to photographing operation. When the photographing termination condition exists, the method proceeds with operation 640, to connect the photographed images and to configure a final panoramic picture.

Referring back to FIG. 6, the panoramic photographing operation according to various embodiments of the present disclosure may be executed. An operation of providing a guide in the described operation, may photograph an image at a corresponding location based on a panoramic photographing initiation command, and provides a guide associated with image distortion or motion blur associated with a subsequently photographed image.

When a degree of distortion, which is obtained by comparing a part (for example, a face) of the reference image and subsequently photographed images, is high, it is determined that the distortion may not be corrected through a distortion correction algorithm. That is, when short distance panoramic photographing is executed and a distance between the photographing device and an object located close to the device varies, an object's scale may change and adjusting a scale of images may be required for composition. In this instance, although the scale is adjusted, a portion of one image may not exist may not exist in another image which may prevent the combining the image. Accordingly, a distance between the camera and the object that is close to the camera should be maintained. In the present disclosure, a guide associated with the same is appropriately provided.

A scale detecting scheme may detect a face from a reference image using a facial detection algorithm and obtain facial size information, may detect a face from a subsequent input image and obtain facial size information, and may compare the facial size information. In addition, size information of other characteristic objects may be compared.

Based on a size information comparison result, a message or a graphic guide material for indicating the maintenance of an appropriate distance between the photographing device and a subject may be displayed. For example, the guide material may be adjusting a size of a guide box indicating a state of a current input image, as described in the following descriptions. The guide material may be configured to provide an appropriate sound or vibration or the like, other than the graphic guide material (or together with the graphic guide material).

In addition, blur caused by hand trembling or movement of a subject may be detected. For example, when it is determined that a contrast of a currently input image is decreased by comparing the image with a part (for example, a face) of the reference image, it is determined that motion blur occurs.

Based on the result of whether motion blur determination, the method displays an appropriate message or a guide material such as graphic effect or the like, so as to request re-photographing or to correct a user photographing method. Alternatively, photographing may be terminated. The guide material may be configured to provide an appropriate sound or vibration or the like, other than the graphic guide material (or together with the graphic guide material).

Referring back to operation 612 of FIG. 6 when panoramic photographing is executed, will be described in detail. The burst shot mode is a scheme of photographing a plurality of consecutive images during a swivel operation for panoramic photographing, similar to the burst shot photographing scheme, and composing a few parts (slices) of the photographed images. The capture mode is a scheme for photographing a smaller number of images than the burst shot mode, and using most parts of the photographed images for composition. That is, the burst shot mode continuously executes consecutive photographing based on a relatively short period, and the capture mode does not have periodicity and photographs images by relatively minimizing an overlap part between photographed images. Generally, the burst shot mode is easy for the user to operate the same, and the capture mode may provide a photographed image with a relatively great quality even in a poor photographing environment.

Accordingly, in various embodiments of the present disclosure, a photographing mode may be appropriately set based on an illumination since there is a high probability of motion blur occurring during photographing in an environment with a low illumination, such as indoor photographing. That is, in the case of a normal illumination, panoramic photographing is executed through the burst shot mode. In the case of a low illumination, panoramic photographing is executed through the capture mode. When the method photographs the photographing-target image as the image of the corresponding order in operation 628, the currently input image is one of a plurality of images used for generating a final single image if the currently input image satisfies the validity criteria in operations 616 and 618.

In the case where the current photographing mode is the capture mode, when a subject continuously moves or the like, the photographing operation continuously accumulates and stores input images at a corresponding location (until a predetermined number of images or a predetermined period of time is satisfied) and selects one that is most appropriate from among the accumulated and stored images. That is, the method analyzes the input images of the corresponding location, and selects an image having a low degree of shaking or distortion.

Also, in the case where the current photographing mode is the burst shot mode, the photographing operation selects a few images based on suitability from among images that are continuously input and stored in real time, and use the same images for generating a final single image. In various embodiments of the present disclosure, as described in the following descriptions, a location in the entire panoramic photographing scope and a photographing state associated with a currently photographed image(s) may be displayed through a separate live thumbnail while panoramic photographing is executed. In this instance, when the panoramic photographing is executed using the burst shot mode, a thumbnail image associated with an image that is currently input in real time may be displayed on the live thumbnail window without separately processing the image, such as transparency or the like.

When the panoramic photographing is executed using the capture mode, a thumbnail image associated with an image that is currently input in real time may be displayed on the live thumbnail window by adjusting transparency or executing a dimming process. Accordingly, a user may recognize that the image that is currently input in real time is not yet photographed. When the currently input image is photographed, the method may remove adjustment of transparency or dimming from the corresponding thumbnail image so that the user may recognize that the currently input image is photographed.

Alternatively, the photographing mode may be changed based on a distance to a subject. Since the distortion of a subject becomes worse at an outer side of a view angle, as an image for composition is obtained from a part closer to the center of the view angle, distortion becomes lower when composition of a panoramic image is executed. By taking into consideration the above, when a distance sensor (for example, a phase difference sensor) detects a distance to a subject, and the distance to the subject is determined as a long distance, the method executes photographing through the capture mode. When the distance to the subject is determined as a short distance, the method executes photographing through the burst shot mode. Determining the distance to the subject may be executed by extracting facial information from a currently input image, and estimating the distance to the subject based on the facial information, in addition to the above described method. That is, a face is detected from the currently input image using a facial detection algorithm and facial size information is obtained, and it is determined that the distance to the subject is close based on a facial size.

Also, in the burst shot mode, a photographing interval of a burst shot may be adjusted to correspond to a distance. For example, as the distance to the subject becomes closer, the photographing interval of the burst shot may be adjusted to be shorter. Alternatively, based on whether a face is detected from an image, the photographing interval of the burst shot may be adjusted. For example, when a face is detected from an image, the photographing interval of the burst shot may be adjusted to be shorter. When a face is not detected in an image, the photographing interval of the burst shot may be adjusted to be longer.

Referring to FIG. 6, while a panoramic photographing operation according to various embodiments of the present disclosure is executed, the method may recognize a movement state of the photographing device. In the case of short-distance panoramic photographing, particularly, self-shot, an image of a subsequent order may be obtained by a motion (movement or the like) of a user in the state in which the photographing device actually does not move. To prevent this error, various embodiments of the present disclosure additionally determine movement of the photographing device using the movement sensing module 422 of FIG. 4 or the like, and regard that panoramic photographing is normally executed only when the photographing device actually moves.

For the same reason, when it is determined that a predetermined area exists in an identical location by comparing an input image and a reference image (for example, when an area where a face is detected exists in an identical location or the like), it is regarded that panoramic photographing is not normally executed. When it is determined that panoramic photographing is not normally executed, a message or a graphic guide material indicating unsuitableness of photographing, or a guide provided in an appropriate form of a vibration or a sound, may be displayed. Accordingly, panoramic photographing may restart or may be terminated.

Figure 7:
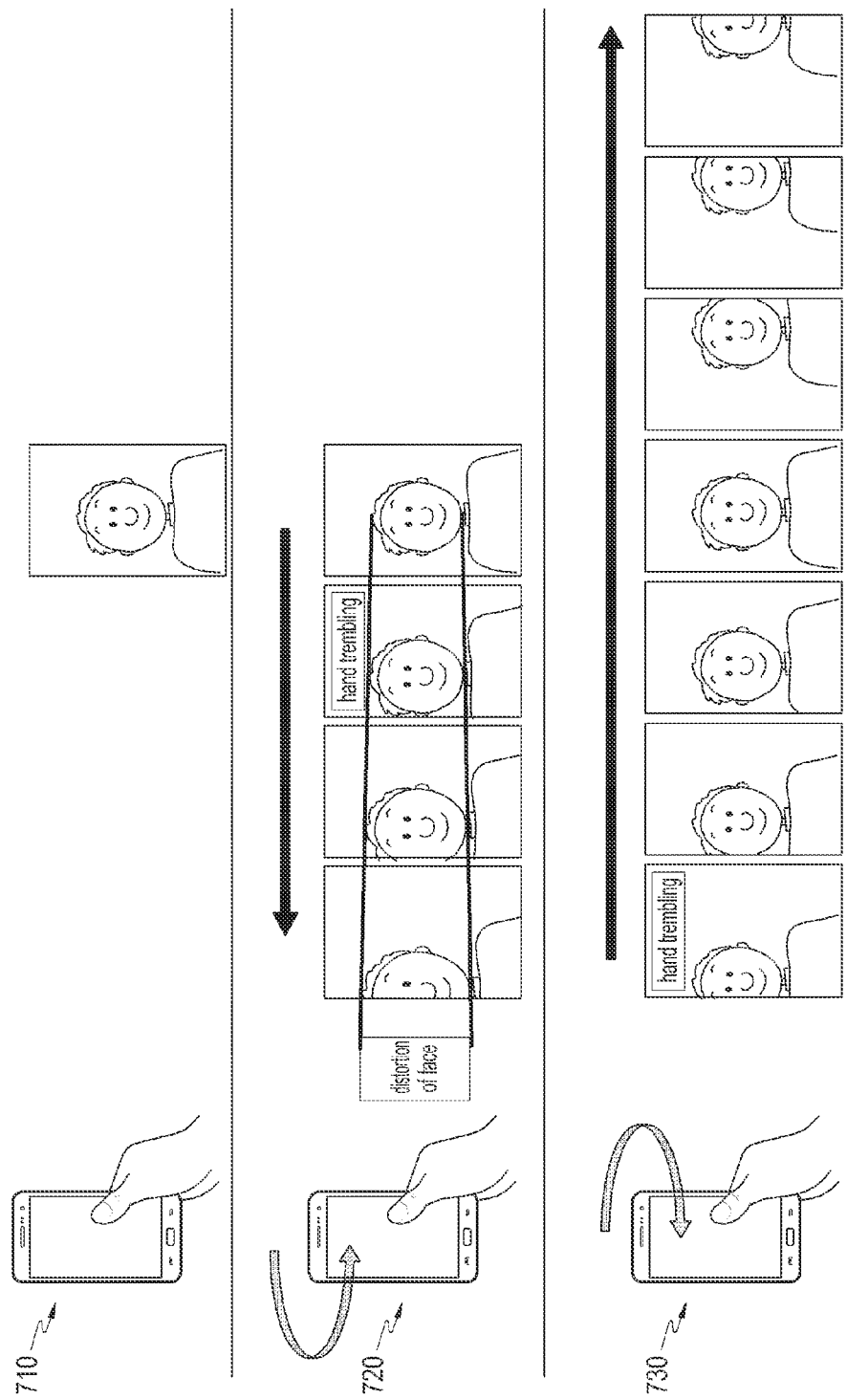
FIG. 7 is a diagram illustrating an example of a user's operation and a photographing screen thereof when panoramic photographing is executed according to various embodiments of the present disclosure.

FIG. 7 is a diagram illustrating an example of a user's operation and a photographing screen thereof when panoramic photographing is executed according to various embodiments of the present disclosure.

Referring to FIG. 7, a reference image is photographed as a first procedure 710 of panoramic photographing. As a second procedure 720, a photographing device is rotated to the left and images on the left side based on the reference image are photographed. As a third procedure 730, the photographing device is rotated to the right and images on the right side based on the reference image are photographed. In this instance, a guide associated with a state where motion blur (hand trembling) or distortion occurs when compared to the reference image may be provided through an appropriate guide material, and a guide associated with an appropriate photographing direction and photographing state may be additionally provided. The guide material that provides a guide associated with the motion blur or distortion existence state may be a graphic guide material displaying an appropriate message or graphics. The graphic guide material may include displaying an arrow to indicate a photographing direction or the like. For example, when photographing is completely executed to the left end in the second procedure 720, an arrow pointing in the opposite direction (a rightward arrow) may be displayed. In addition, the guide material that provides a guide associated with the motion blur or distortion existence, or a photographing direction or the like may be configured to generate an appropriate sound such as voice, alarm or the like, and shaking state may be reported to the user through a vibration state or the like of a terminal when a motion blur state occurs.

The panoramic photographing procedure may be appropriate for the self-shot. That is, the user may photograph a reference image including the user in the center through the self-shot function, and photograph the left and right sides for the panoramic photographing scheme.

Referring to the panoramic photographing scheme of FIG. 7, images that panoramic photographing photographs using the burst shot mode are illustrated in FIG. 7. Also, the panoramic photographing scheme of FIG. 7 photographs images by rotating a photographing device in one direction (to the left or to the right) after photographing a first reference image, and rotates the photographing device in the opposite direction to return to a location where a first photographing is executed and photographs other images.

In this instance, a difference between the first photographed reference image and an input image when the photographing device returns to the location where the first photographing is executed after completing photographing in one direction (to the right or to the left), may frequently occur. In this instance, when the difference between images is relatively large, a composition error may occur. In this instance, a size of faces may be compared to determine a degree of the difference between the first photographed reference image and the input image when the photographing device returns to the first location. When several faces are detected from the first photographed reference image, a distance between the faces may be compared. Determining the difference between images may be executed by determining information associated with a distance to the subject for each image using a distance sensor (for example, a phase difference sensor) that detects a distance to a subject.

While panoramic photographing is executed, the difference between the reference image and the input image obtained when the photographing device returns to the first location may cause a problem.

Therefore, various embodiments of the present disclosure receive an input of the first photographed reference image and receive, again, an input of an image of the location where photographing is already executed (that is, photographing an image multiple times) when the photographing device returns to the location where the first photographing is executed after completing photographing in one direction (to the left or to the right), regenerate a thumbnail image using the input image received again, and show the regenerated thumbnail image instead of a thumbnail image obtained through composition in real time. Two composition results may be generated using the first photographed reference image and the input image when the photographing device returns to the first location, or a composition result may be generated by selecting an image that has a better quality than the other or an image that is more appropriately connected with another input image from the two results. Alternatively, an image including a face with a smile may be selected as an appropriate image from among images obtained by photographing multiple times.

Although it is described that the panoramic photographing scheme of FIG. 7 photographs images by rotating the device to the left and to the right after photographing a first reference image, various embodiments of the present disclosure may photograph images by rotating the photographing device to the top side and the bottom side. Also, panoramic photographing may be executed by rotating the photographing device in only one direction (to the left or to the right).

Figure 8A:
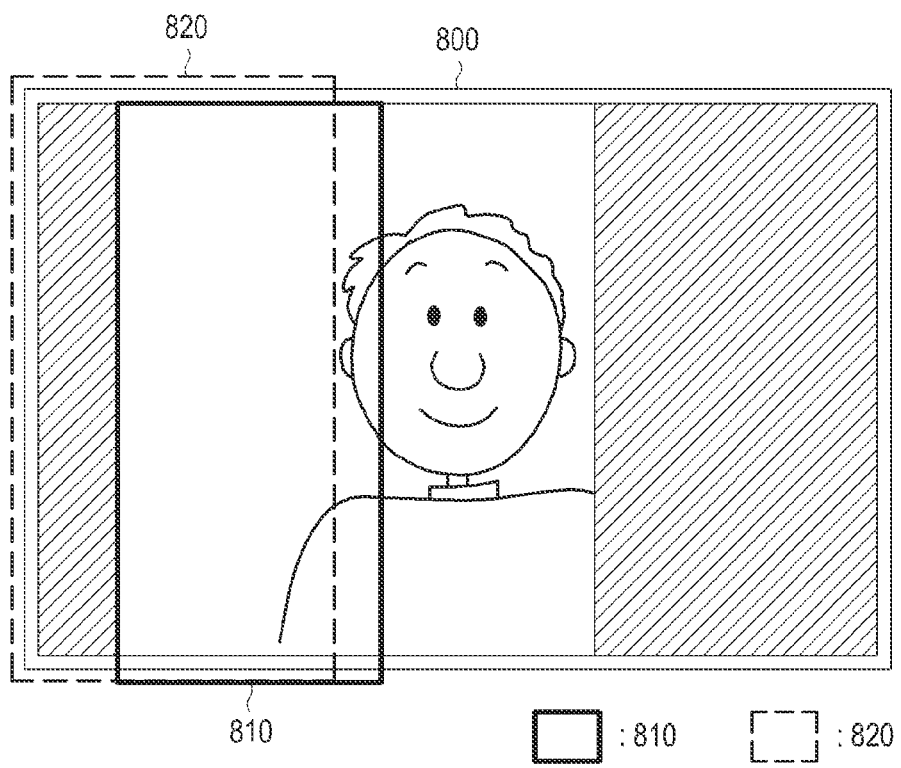
FIGS. 8A and 8B are diagrams illustrating examples of a graphic guide material when panoramic photographing is executed according to various embodiments of the present disclosure.
Figure 8B:
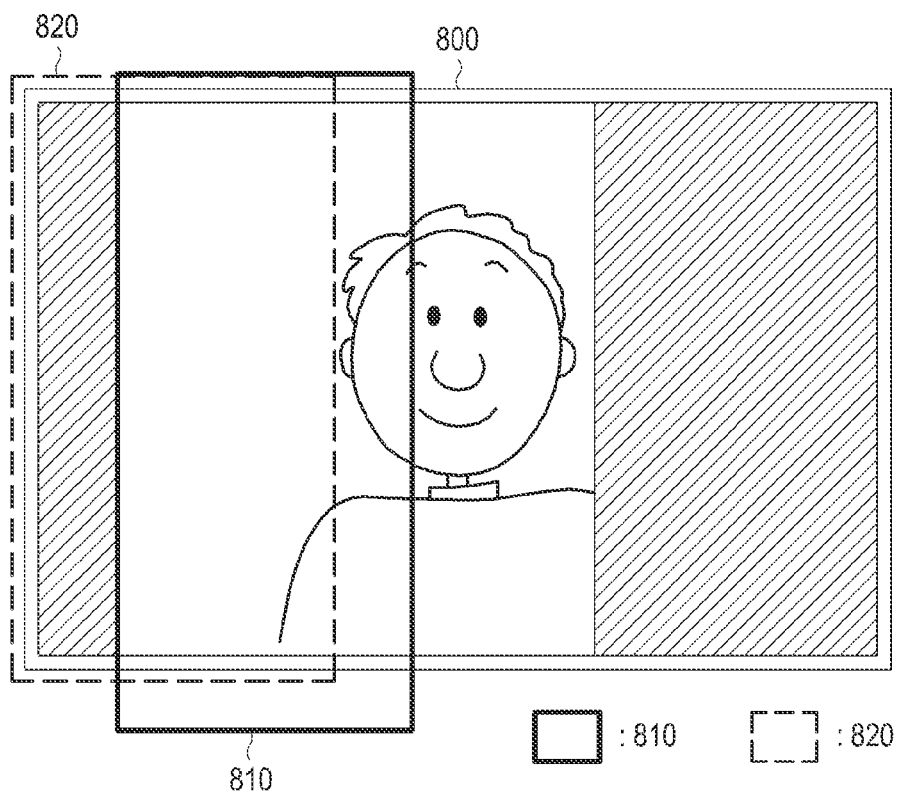

FIGS. 8A and 8B are diagrams illustrating examples of a graphic guide material when panoramic photographing is executed according to various embodiments of the present disclosure.

Referring to FIGS. 8A and 8B, the graphic guide material may have a thumbnail window 800 that generates a thumbnail image associated with a photographed image and an image obtained by connecting them, and appropriately displays the thumbnail image based on a location in the entire panoramic photographing scope and a photographing state. That is, the thumbnail image is an image obtained by reducing an actual image is obtained by resizing the actual image or extracting a few feature areas from the actual area. The thumbnail window 800 indicates an area set in advance to display a thumbnail image on a display screen. Referring to FIGS. 8A and 8B, a thumbnail image associated with a currently photographed image in the entire panoramic photographing scope may be displayed in the thumbnail window 800. A part that is not currently photographed (or a part of which an image is not input) may be expressed as a black area (i.e., a part filled with oblique hatching pattern).

Also, as a graphic guide material displays a state of a currently input image (i.e., a location of the currently input image in the entire panoramic photographing scope, distortion or motion blur of the currently input image, or the like) while displaying the thumbnail window 800, a first guide material 810 (a bold solid-line box) may be displayed. The graphic guide material displays a location for subsequent photographing (i.e., a location of an image to be photographed in a subsequent order or a photographing direction in a subsequent order as a second guide material 820 (a broken line box).

Referring to FIG. 8B, the first guide material 810 is displayed to be larger to show a state of the currently input image and shows that a face of the currently input image is input to be larger than the reference image due to distortion. As described above, the distortion of the currently input image may be indicated by the size of the first guide material 810 or by requiring an appropriate adjustment of the size of the first guide material 810 to correspond to the same. Additionally, the motion blur of the currently input image may be expressed by shaking the first guide material 810. Also, the motion blur state may be indicated by flickering the first guide material 810, or may be indicated using a different color. In addition, the motion blur may be indicated through a graphic guide material that is displayed separated from the first guide material 810. Also, the motion blur state may be indicated by applying a blur effect to a display image in a preview area that displays a currently input image in the thumbnail window 800.

Also, according to another embodiment of the present disclosure, the motion blur may be reported to a user through a vibration or a sound of a terminal when motion blur or distortion occurs. As described in other embodiments of the present disclosure, when an angle of a currently input image is out of an appropriate scope and moves to the top or bottom sides or to the left or right sides, a graphic guide material provided in, for example, an arrow shape that leads the photographing direction to an appropriate location may be additionally displayed.

Also, a when the photographing device experiences motion blur state or distortion, the current state of the photographing device may be displayed through another device that is electrically connected to the photographing device. For example, an electronic device to which the photographing device is applied according to the present disclosure may be electrically connected to another electronic device (or a supplementary electronic device) that is adjacent to the electronic device, through pairing or the like. In this instance, the electronic device to which the photographing device may transfer information associated with the current photographing state to the other electronic device. Therefore, the paired other electronic device may be configured to provide an appropriate graphic guide material, a vibration, or a sound, for indicating motion blur, distortion, a photographing direction, or the like.

Displaying the second guide material 820 may be omitted, for example, when the current panoramic photographing mode is a burst shot mode.

Figure 9A:
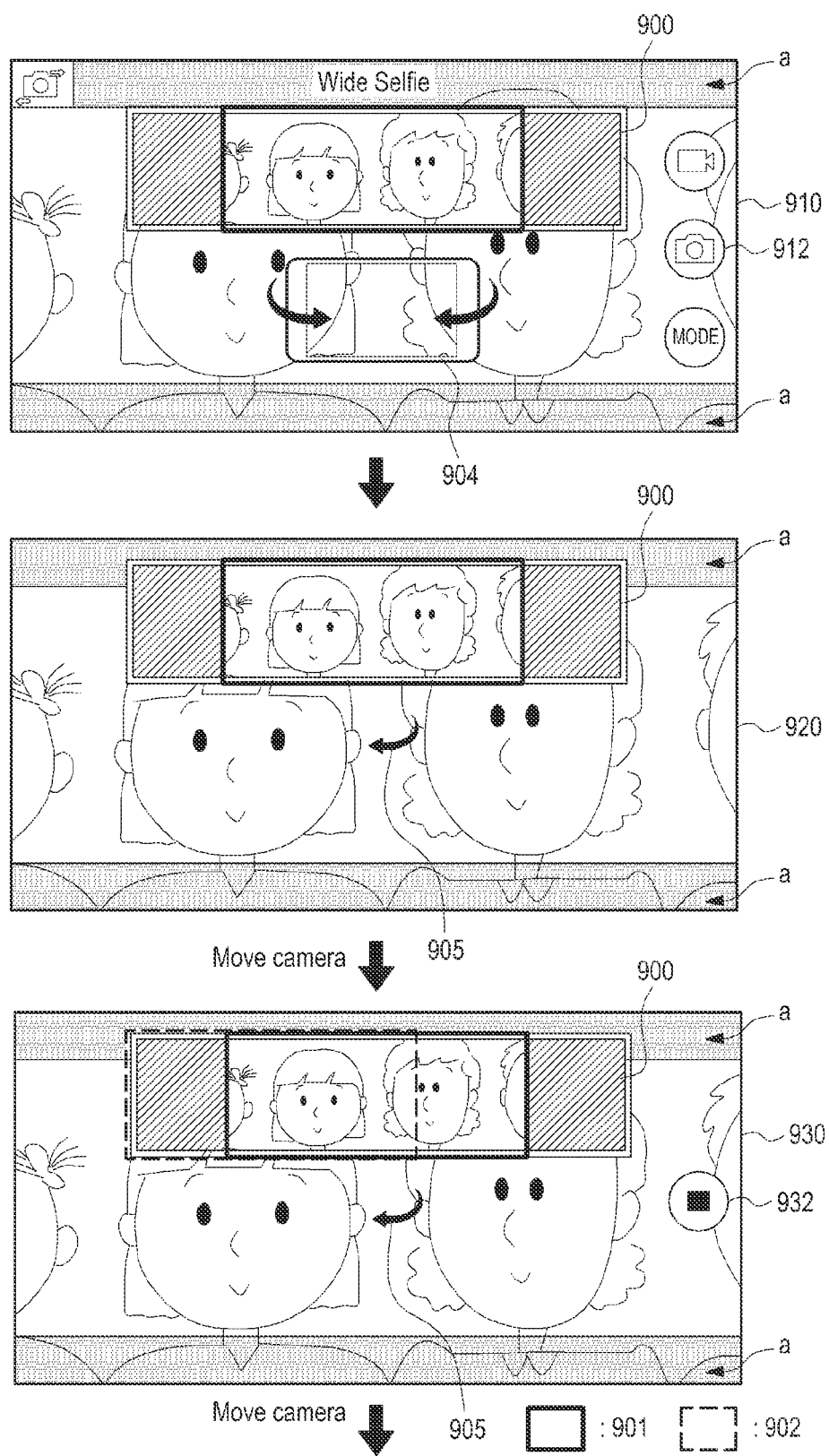
FIGS. 9A, 9B, and 9C are diagrams illustrating examples of a display screen when panoramic photographing is executed according to various embodiments of the present disclosure.
Figure 9B:
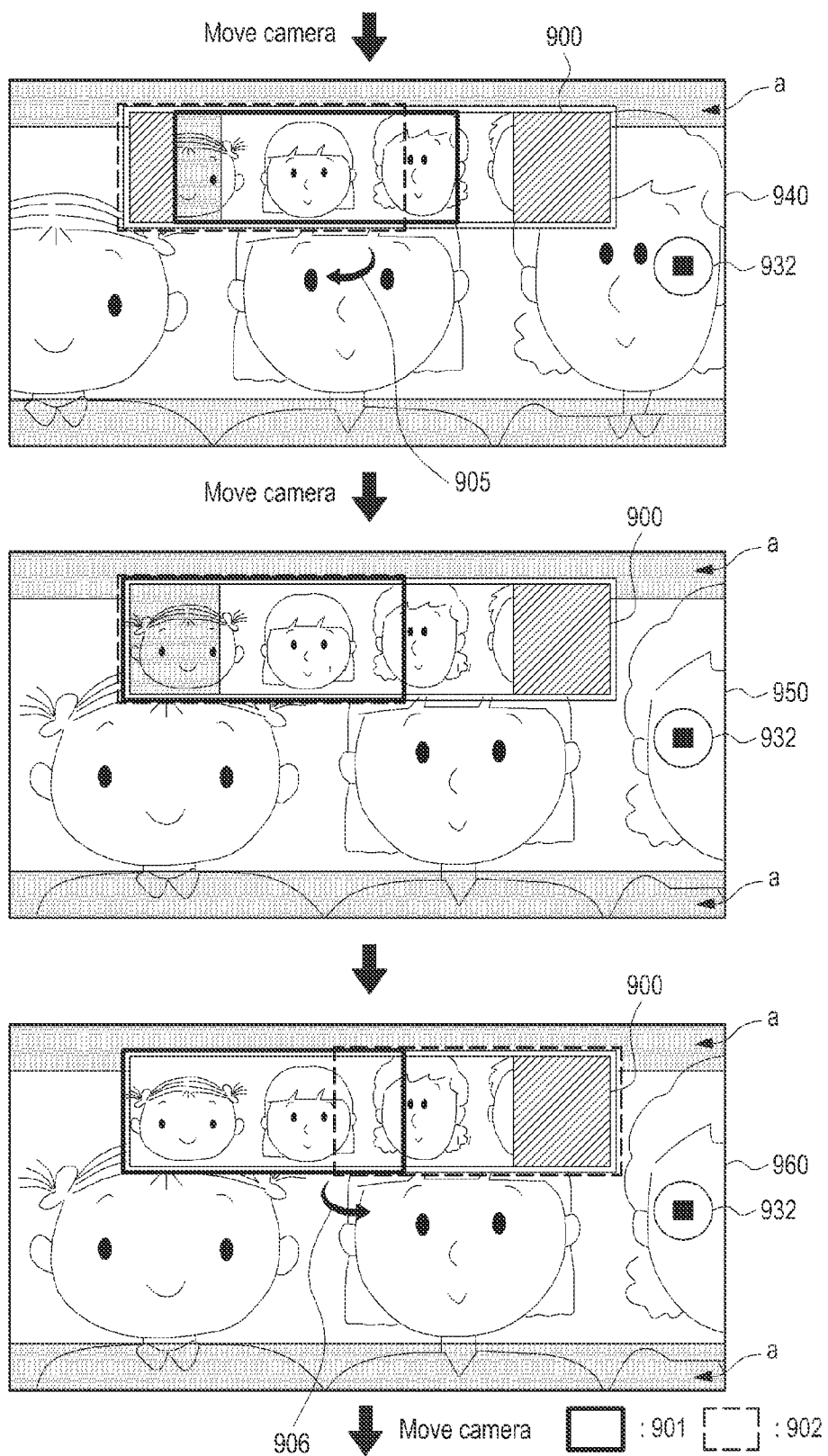
Figure 9C:
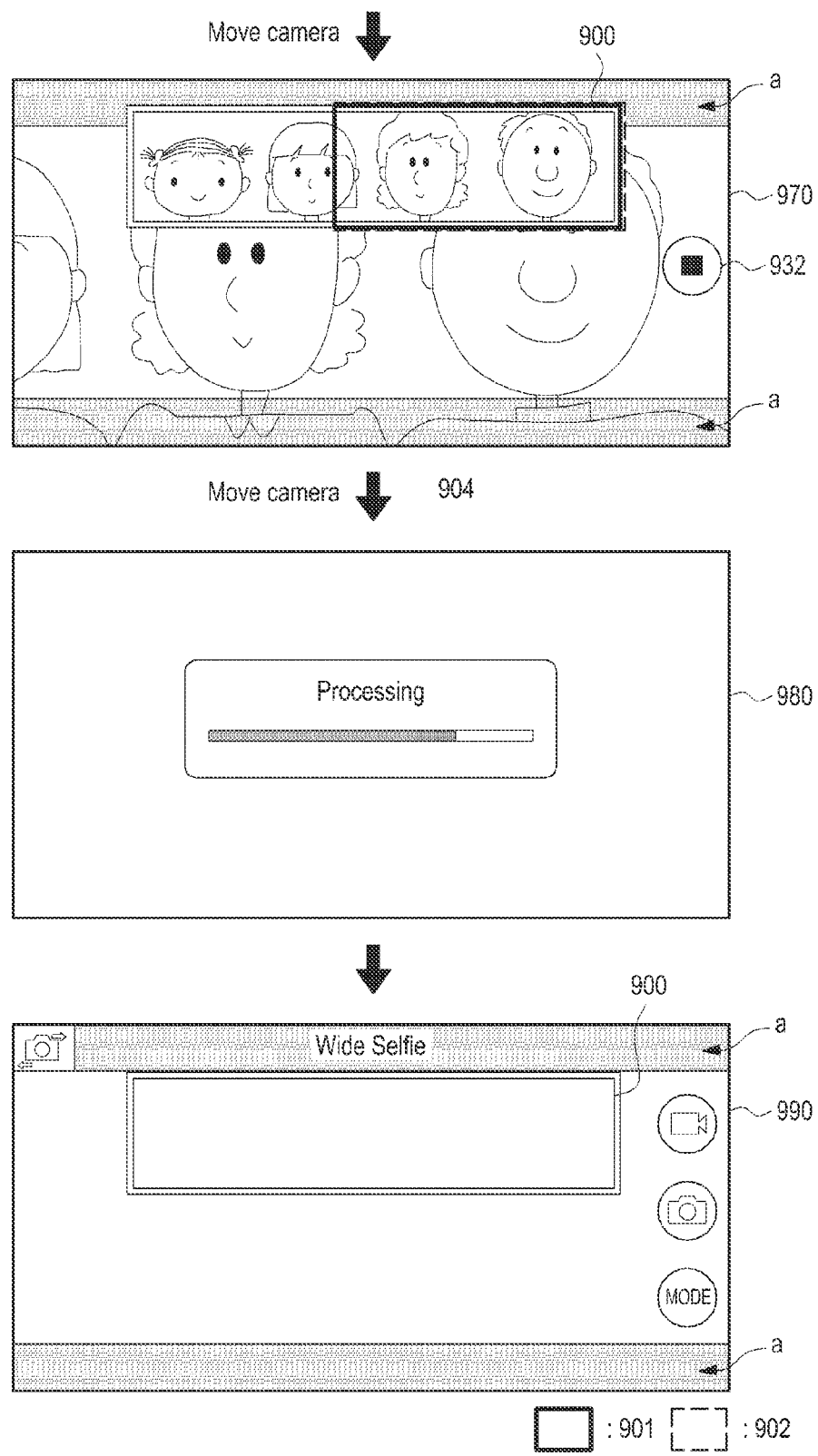

FIGS. 9A, 9B, and 9C are diagrams illustrating examples of a display screen when panoramic photographing is executed according to various embodiments of the present disclosure.

Referring to FIGS. 9A, 9B, and 9C, screens 910, 920, 930, 940, 950, 960, 970, 980, and 990 may be sequentially displayed when panoramic photographing is executed. The examples are associated when panoramic photographing is executed with movement of the device to the left and to the right, after a reference image is photographed. In this instance, FIGS. 9A, 9B, and 9C show examples, for example, when panoramic photographing is executed using the capture mode.

Referring to FIGS. 9A, 9B, and 9C, while panoramic photographing is executed, each display screen has a thumbnail window 900. In each thumbnail window 900, a first guide material 901 that displays a state of a currently input image and a second guide material 902 (broken line box) that leads photographing to a subsequent photographing location, are appropriately illustrated. Also, a third guide material 905 and 906 that indicates a photographing direction may be additionally displayed. Although not illustrated, a guide in a form of a message may be additionally provided, and the corresponding message may be displayed in an appropriate location on a few display screens.

Also, a portion of the top end and the bottom end of which transparency is adjusted or that is processed to be dim are illustrated in a few display screens. In panoramic photographing, when photographed images are connected to each other, offset parts may be removed to evenly arrange the top ends and the bottom ends. Accordingly, a portion of the top side and the bottom side may be removed from an actually input image, and thus, the portion that is to be removed from the display screens may be processed through adjustment of transparency or a dimming. Also, the thumbnail window 900 may generate a thumbnail image by excluding a portion to be removed from an input image, and display the same.

Also, the portion indicated by 'a' in the few display screens may be set to be displayed in a bright color (for example, white) so as to provide supplementary light when an illumination is low in a current photographing environment.

FIG. 9A illustrates a screen that begins panoramic photographing. A currently input image is displayed in a first display screen 910, and a thumbnail image of the corresponding input image is displayed in the center of the thumbnail window 900. Also, in the first display screen 910, a fourth guide material 904 is displayed to indicate rotation of an electronic device for panoramic photographing.

Also, a camera photographing item 912 is appropriately provided on the first display screen 910. A user may appropriately operate the camera photographing item 912 (for example, inputting a touch on a touch screen) to begin panoramic photographing. In this instance, the currently input image is photographed as a reference image as shown in a second display screen 920. In the second display screen 920, a third guide material 905 is displayed in a form of an arrow to indicate photographing direction. The third guide material 905 may flicker.

Subsequently, as illustrated in a third display screen 930 and a fourth display screen 940, the first guide material 901 and the second guide material 902 are appropriately displayed in the thumbnail window 900 according to a movement of the photographing device, and a thumbnail image may also be appropriately displayed in the thumbnail window 900 according to an input image. In this instance, in the third display screen 930 and the fourth display screen 940, a photographing termination item 932 may be included. When the photographing termination item 932 is input, panoramic photographing may be immediately terminated.

Subsequently, the fifth display screen 950 illustrates when the photographing device moves to the last photographing point. According, the sixth display screen 960 displays the second guide material 902 to provide guidance to move the photographing device to the right to continue capturing the images.

A seventh display screen 970 displays that the photographing device moves to the right, up to a predetermined last photographing point, and completes photographing at the corresponding point. Subsequently, an operation of connecting photographed images and generating a final panoramic picture is generated as shown in the eighth display screen 980. However, when panoramic photographing is terminated, the photographing device proceeds with a photographing wait state as shown in a ninth display screen 990.

Figure 10:
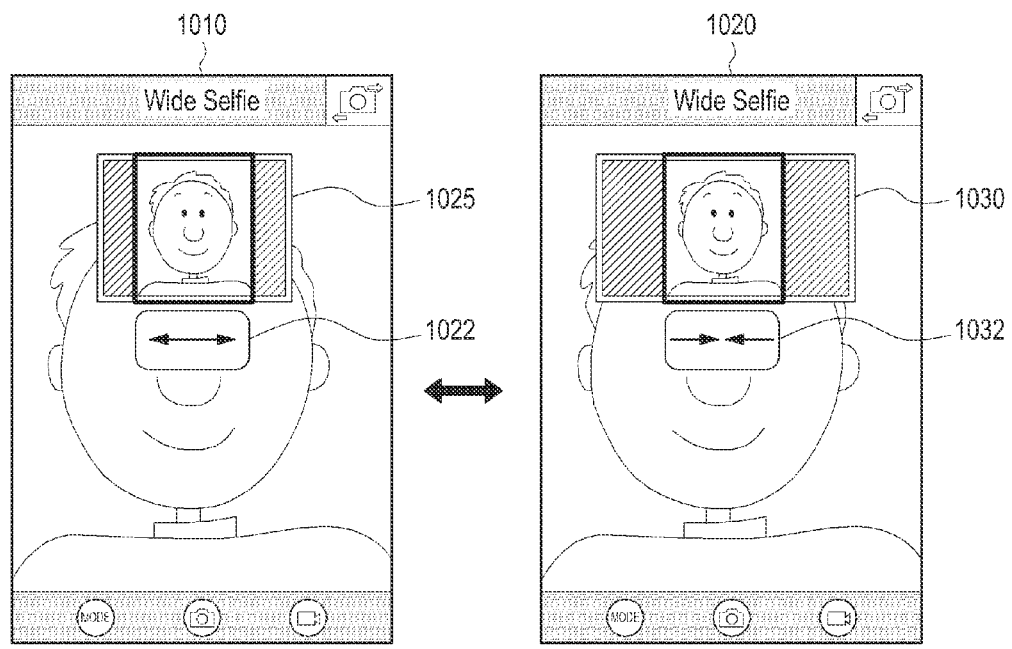
FIG. 10 is a diagram illustrating another example of a display screen when panoramic photographing is executed according to various embodiments of the present disclosure.

FIG. 10 is a diagram illustrating another example of a display screen when panoramic photographing is executed according to various embodiments of the present disclosure.

Referring to FIG. 10, when panoramic photographing is executed, a panoramic photographing scope setting item 1022 and 1032 may be appropriately displayed in a display screen 1010 and 1020 that enables a user to select a panoramic photographic scope. The user operates the panoramic photographing scope setting item 1022 and 1032 to set a desired panoramic photographing scope. In this instance, a size of a thumbnail window 1025 and 1030 may be configured to be displayed in a corresponding size based on the setting of the photographed scope item 1022 and 1032.

The panoramic photographing scope setting item 1022 and 1032 may be configured to be displayed only when a portrait is photographed. Also, the panoramic photographing scope may be changed by changing a view angle to, for example, 120 degrees and 150 degrees.

Figure 11:
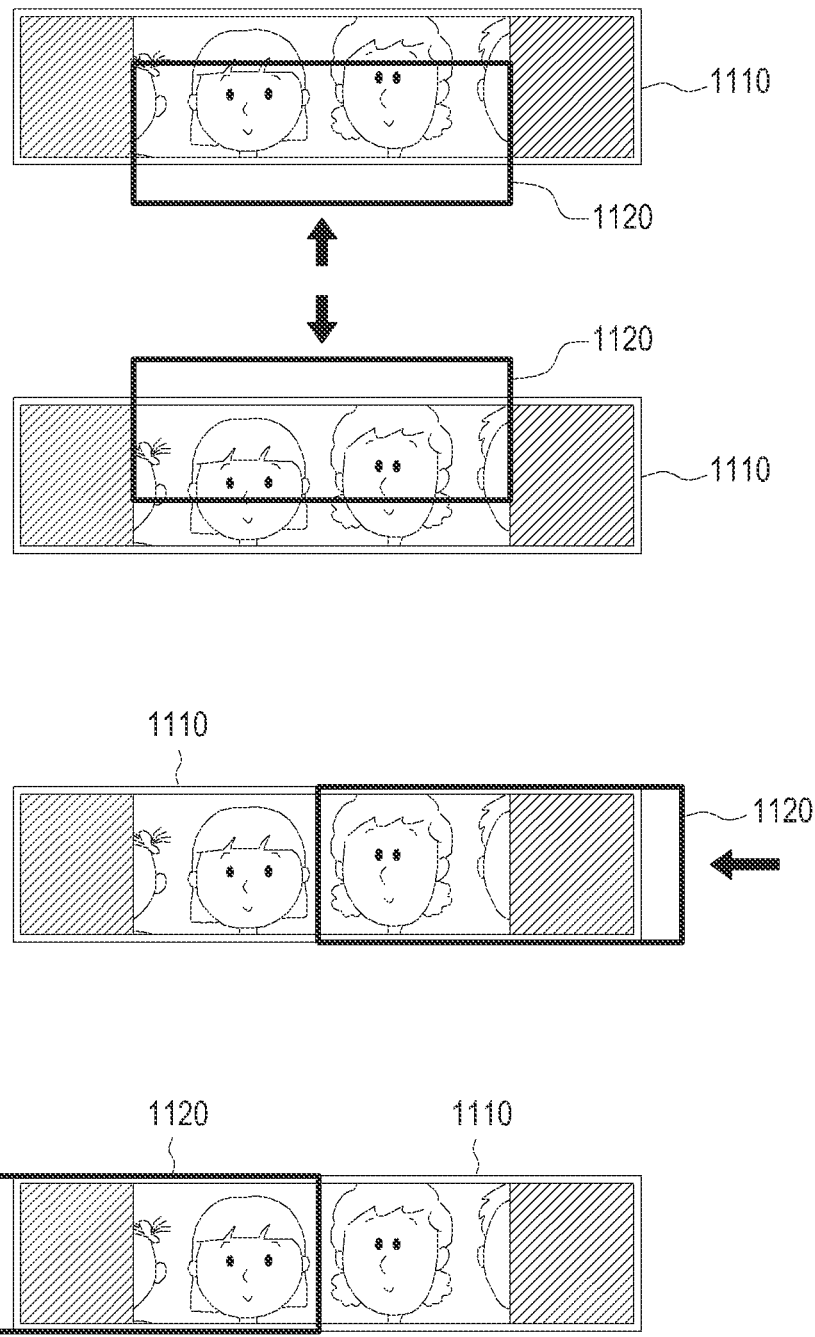
FIG. 11 is a diagram illustrating another example of a graphic guide material when panoramic photographing is executed according to various embodiments of the present disclosure.

FIG. 11 is a diagram illustrating another example of a graphic guide material when panoramic photographing is executed according to various embodiments of the present disclosure.

Referring to FIG. 11, when an angle of a currently input image is out of an appropriate scope and moves to the top or bottom sides or the left or right sides, a graphic guide material in a form of an arrow that leads a photographing direction to an appropriate location may be added and displayed in a first guide material 1120 that indicates a state of a current input image in a thumbnail window 1110. In this instance, the guide that leads the photographing direction to the appropriate location may be configured to provide an appropriate sound or vibration or the like, other than the graphic guide material (or together with the graphic guide material).

Figure 12A:
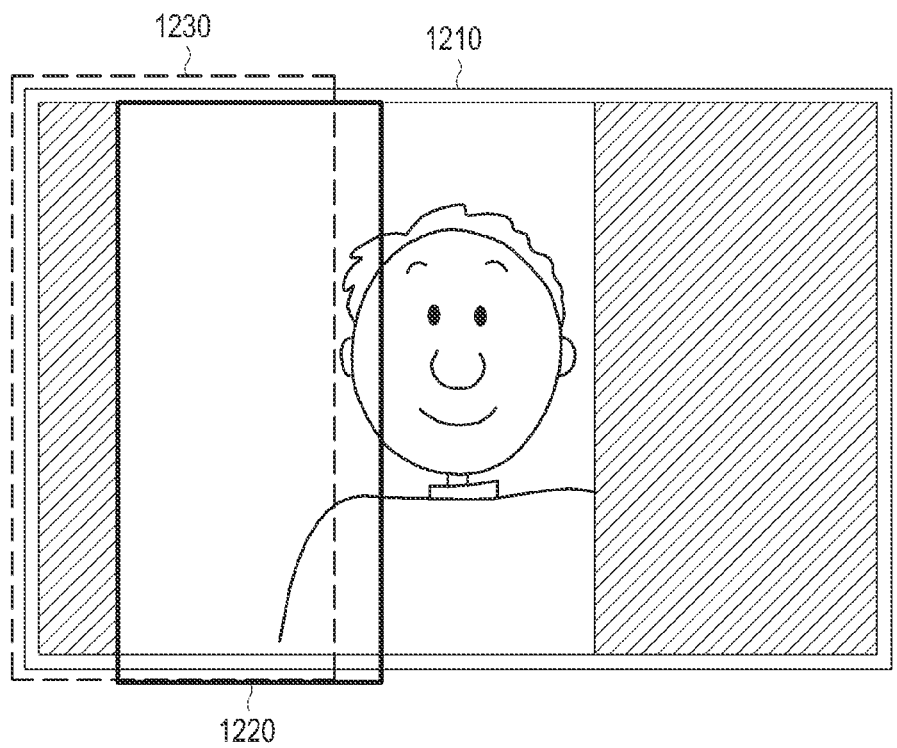
FIGS. 12A and 12B are diagrams illustrating other examples of a graphic guide material when panoramic photographing is executed according to various embodiments of the present disclosure.
Figure 12B:
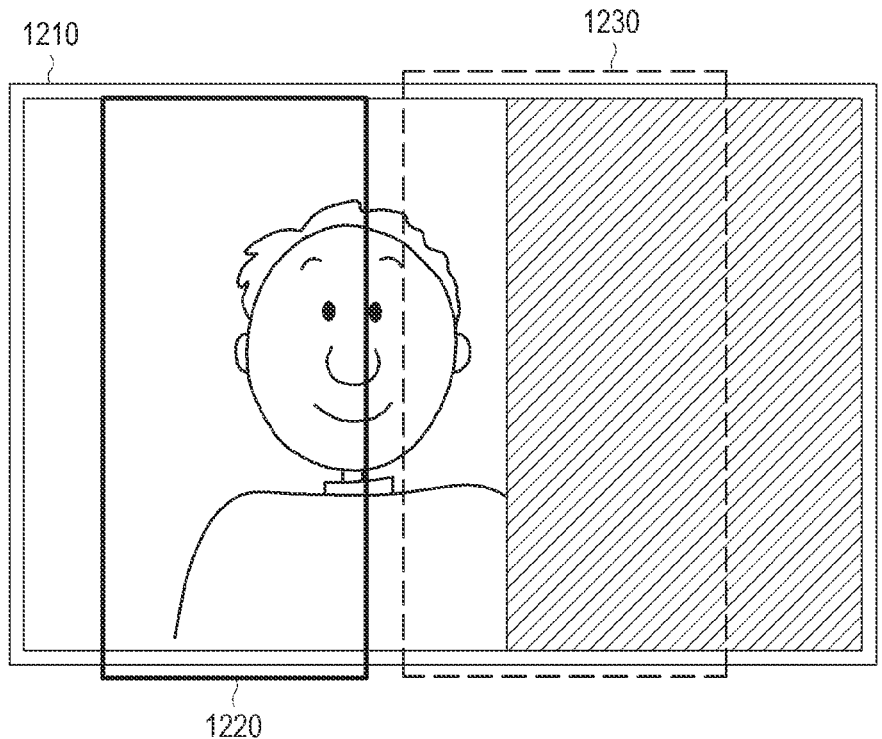

FIGS. 12A and 12B are diagrams illustrating examples of a graphic guide material when panoramic photographing is executed according to various embodiments of the present disclosure.

Referring to FIG. 12A, a thumbnail window 1210, and a first guide material 1220 (bold solid-line box) indicates a currently input image and a second guide material 1230 (broken line box) that leads photographing to a subsequent photographing location. While photographing to the left and the movement direction changes to the right, the second guide material may change positions to the right as illustrated in FIG. 12B. In this instance, when a movement of the corresponding photographing device stops during a predetermined period of time (that is, maintains a current photographing posture), the graphic guide material may be configured to terminate panoramic photographing by determining that the entire panoramic photographing is completed. In this instance, the guide that changes the photographing direction may be configured to provide an appropriate sound or vibration or the like, other than the graphic guide material (or together with the graphic guide material).

The panoramic photographing operation of FIGS. 12A and 12B are appropriate when a current panoramic photographing mode is a burst mode. If the current panoramic photographing mode is a capture mode or the like, when a photographing direction changes and a photographing device does not move to a predetermined photographing point, a guide to lead continuous photographing to the current direction, may be provided.

When the panoramic photographing mode is the capture mode, the user may obtain a result only after completion of photographing at the left/right end, which is inconvenient. Therefore, an option that enables the user to terminate photographing during the panoramic photographing may be provided. For example, when a movement of the photographing device stops during a predetermined period of time while photographing is executed to the left/right an image photographed up to the corresponding point is reflected to a thumbnail and panoramic photographing may be terminated. Alternatively, when the camera stops but a subject moves, a plurality of images are photographed at the corresponding location and an image that is most appropriate for composition may be selected from among the plurality of images and may be used.

Figure 13:
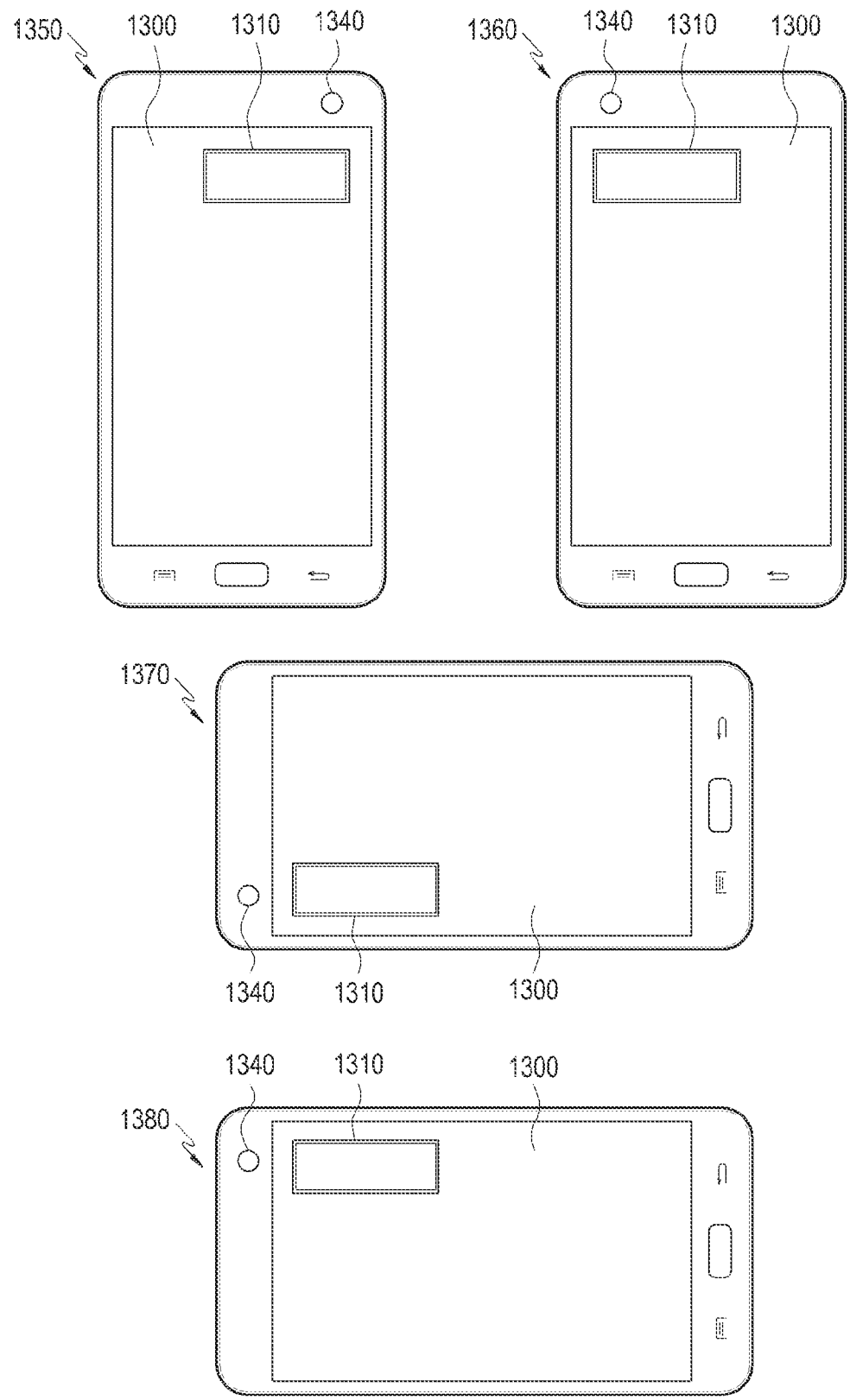
FIG. 13 is a diagram illustrating an example of a location of a graphic guide material on a display screen when panoramic photographing is executed according to various embodiments of the present disclosure.

FIG. 13 is a diagram illustrating an example of a location of a graphic guide material in a display screen when panoramic photographing is executed according to various embodiments of the present disclosure.

Referring to FIG. 13, a graphic guide material 1310 may be embodied to be displayed in a location of the entire display screen 1300, which corresponds to a location where a photographing module 1340 is installed in an actual electronic device while oriented in different positions 1350, 1360, 1370, and 1380.

Referring to FIGS. 5 to 13, a panoramic photographing operation according to various embodiments of the present disclosure may be executed. In the descriptions, for example, an operation of photographing an image using a camera on the front side of the electronic device or a camera on the back side will be described. Additionally, in another embodiment of the present disclosure, panoramic photographing may be executed using both the front camera and the back camera.

In other embodiments of the present disclosure, panoramic photographing may simultaneously operate, for example, the front camera and the back camera, and simultaneously photograph two panoramic pictures using the front camera and the back camera. In this instance, a photographing guide according to the present disclosure may be configured to be provided for an image that is photographed through one of the front camera and the back camera based on a selection of the user. The photographing guide may be configured to be provided with respect to the two panoramic photographing images.

Also, according to other embodiments of the present disclosure, when panoramic photographing is executed using the back camera, the front camera is also operated and an image input through the front camera is analyzed to determine whether a rotation of the corresponding photographing device is normally executed. For example, the determination that the photographing device is correctly rotated may be determined based on information associated with a face of a user obtained from the image input through the front camera, and an additional guide may be provided through the same.

Subsequently, the present disclosure will be described from the perspective of 3D scan photographing.

Figure 14:
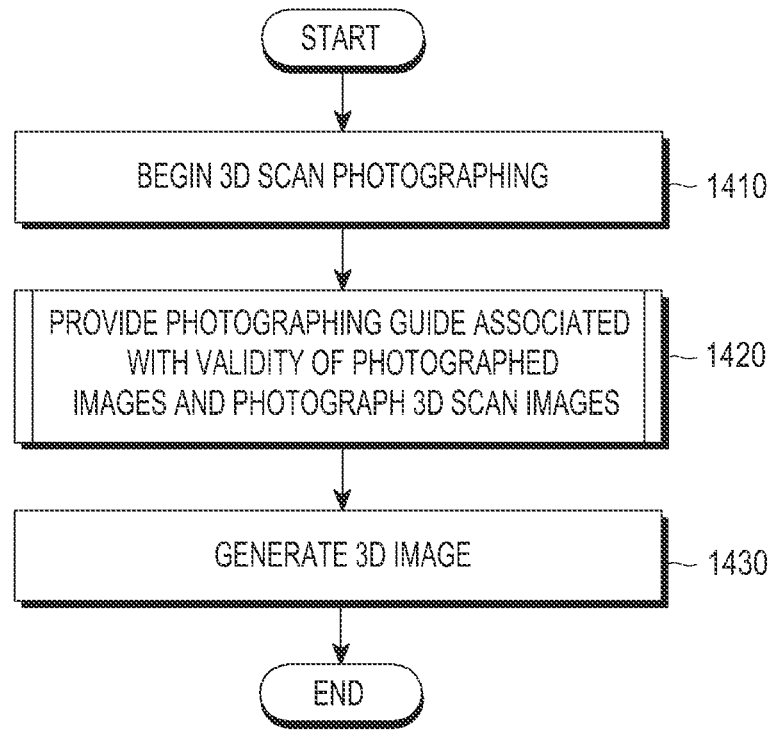
FIG. 14 is a flowchart illustrating a three dimensional (3D) scan photographing method according to various embodiments of the present disclosure.

FIG. 14 is a flowchart illustrating a 3D scan photographing method according to various embodiments of the present disclosure. For example, the method may be executed in the photographing device of FIG. 4, under a control of the image analyzing module 420.

Referring to FIG. 14, the method may be executed in the photographing device of FIG. 4, under a control of the image analyzing module 420. First, 3D scan photographing begins in operation 1410. The operation may be executed when a 3D scan photographing function is selected by a user from photographing function items in the photographing device.

Subsequently, in operation 1420, the method executes sequentially photographing a plurality of images forming a 3D scan image, and provides, in real time a photographing guide associated with the validity of each of the photographed images. In this instance, the validity of each photographed image may correspond to recognizing a quality of an image such as motion blur, distortion, or the like. Also, the photographing guide may be configured to display an appropriate graphic guide material indicating information associated with motion blur of an image, distortion, or the like, or to generate an appropriate vibration, sound, or the like.

Subsequently, a single 3D scan image may be generated by analyzing feature points from the photographed images, in operation 1430.

Figure 15:
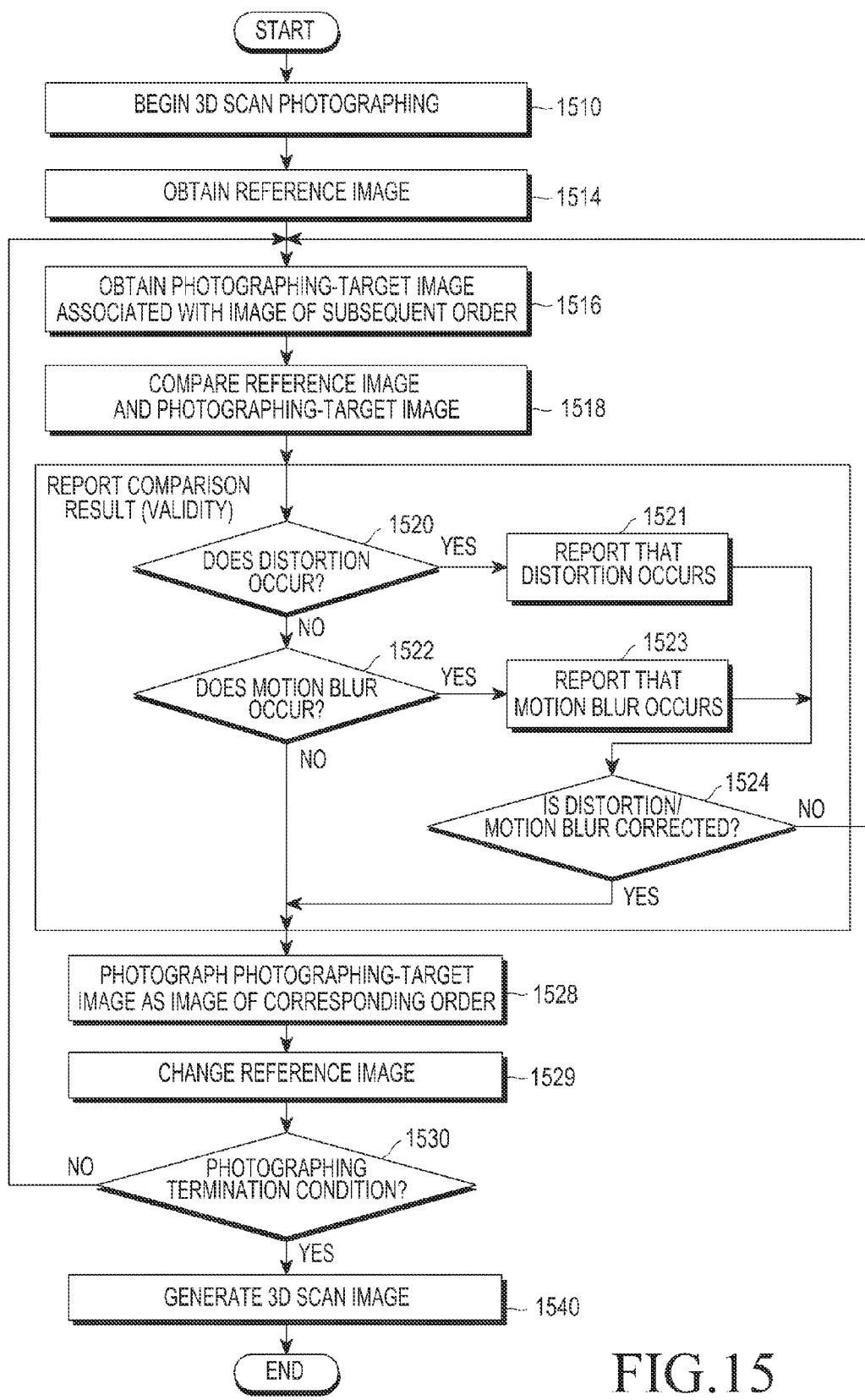
FIG. 15 is another flowchart illustrating a 3D scan photographing method according to various embodiments of the present disclosure.

FIG. 15 is another flowchart illustrating a 3D scan photographing method according to various embodiments of the present disclosure.

Referring to FIG. 15, 3D scan photographing begins in operation 1510. In operation 1514, a reference image is obtained from the scan photographing. The reference image is a reference used for comparing images to be photographed subsequently, and a first photographed image may be set as the reference image at an initial stage.

Subsequently, in operation 1516, a photographing-target image of a subsequent order is obtained. In this instance, an appropriate guide for photographing an image of a subsequent order may be provided to a user. In operation 1518, the method compares the reference image and the photographing-target image. In this instance, the comparison scheme may be determining whether distortion or motion blur exists in the photographing-target image.

In operations 1520 to 1524, the method reports, to the user, a result (i.e., validity) of comparison between the reference image and the photographing-target image, through an appropriate guide. That is, the method determines whether distortion occurs in operation 1520. When distortion occurs, the method proceeds with operation 1521 to provide distortion information to the user through an appropriate message. In the same manner, the method determines whether motion blur occurs in operation 1522. When the motion blur occurs, the method provides motion blur information to the user through an appropriate guide. In this instance, when a degree of the distortion or motion blur is high, the method may provide a guide that requests termination of photographing or re-photographing, in operations 1521 and 1523. A guide that requests re-photographing may be configured to guide a user's movement of the photographing device to a location where re-photographing is needed.

The guide may be configured to provide a message in a form of text, a graphic guide material, or to generate an appropriate vibration or sound. The guide may be provided through another device that is electrically connected (paired) with the current photographing device. After executing operations 1521 and/or 1523, the method determines whether distortion or motion blur is corrected in operation 1524. When the distortion or motion blur is not corrected at operation 1524, the method proceeds back to operation 1516 to repeat the process. When the distortion or motion blur is corrected at operation 1524, the method proceeds to operation 1528.

Referring back to the operation 1520, the distortion of the image may be determined by comparing feature points between the reference image and subsequently photographed images. That is, when 3D scan photographing is executed and a distance between the photographing device and an object located close to the device varies, an object's scale may change, and thus, changes may occur in scale of feature points of the images. Referring to operation 1522, determining whether motion blur of a photographed image occurs based on comparison with the reference image and may be executed by determining whether blur occurs in the same manner as panoramic photographing. That is, when it is determined that a contrast of a currently input image decreases when compared with a part of the reference image, it may be determined that motion blur occurs.

When motion blur or distortion does not occur in operation 1520 and 1522, or when the degree of motion blur or distortion is insignificant and may be corrected, the method may proceed with operation 1528 to photograph the photographing-target image as an image of a corresponding order.

Subsequently, in operation 1529, the method changes the reference image with a currently photographed image. The operation may be applied when 3D scan operation is executed with respect to a relatively wide scope, and may be used when a photographing scope is out of the scope of the initially photographed reference image. For example, this may be applied when 3D scan photographing is executed by rotating the photographing device 360 degrees at the same place, that is, an 'indoor map generating' function is used.

Subsequently, in operation 1530, the method determines whether a photographing termination condition exists. The photographing termination condition may include the case where images for a 3D scan image are all photographed, or the case where a photographing termination operation, which is separately provided, is input. When the photographing termination condition does not exist, the method returns to operation 1516 to repeat the process. When the photographing termination condition exists, the method proceeds with operation 1540 to generate a final 3D scan image using the photographed images.

Referring to FIG. 15, a 3D scan photographing operation may be executed according to various embodiments of the present disclosure. In the operation, various detailed 3D scan photographing schemes may be applied. For example, an operation that analyzes a photographed image and executes photographing by increasing the number of times of photographing, may be additionally performed when a subject is distant or includes many details.

Figure 16:
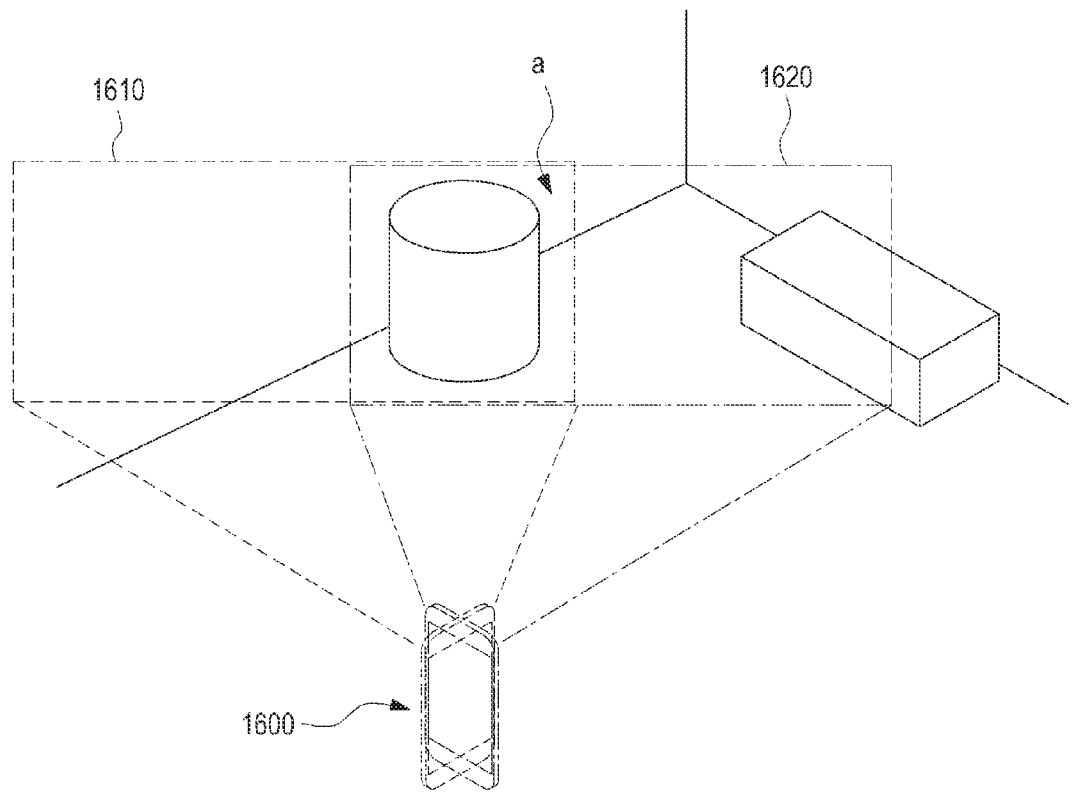
FIG. 16 is a diagram illustrating an example of a photographing environment when 3D scan photographing is executed according to various embodiments of the present disclosure.

FIG. 16 is a diagram illustrating an example of a photographing environment when 3D scan photographing is executed according to various embodiments of the present disclosure.

Referring to FIG. 16, an example of a photographing environment when 3D scan photographing is executed may be executed by rotating a photographing device 1600 360 degrees, that is, when an 'indoor map generating' function is executed. When the 3D photographing is executed, a reference image needs to be continuously updated so as to compare a previously photographed image (for example, the reference image) and a currently photographed image.

A first photographed image 1610 expressed as a broken line box may be set as a reference image, and a part of the reference image may be defined as a "reference image area (a)" by taking into consideration a photographing direction. A part of a second photographing image 1620, that is, an area corresponding to the reference image area (a) (that is, a common area with the reference image area) may be defined as a new target area for comparison. In this instance, quality (e.g., motion blur) of the areas that are commonly included in the first photographed image 1610 and the second photographed image 1620 (that is, the reference image area and the target area for comparison) may be compared. When the first photographed image 1610 and the second photographed image 1620 are in similar level, the reference image is updated as described above. The operation may be continuously repeated while 3D scan photographing is executed.

Figure 17:
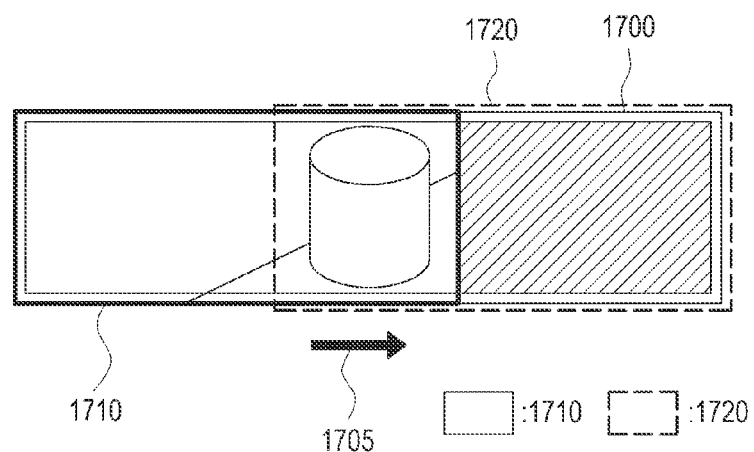
FIG. 17 is a diagram illustrating an example of a graphic guide material when 3D scan photographing is executed according to various embodiments of the present disclosure.

FIG. 17 is a diagram illustrating an example of a graphic guide material when 3D scan photographing is executed according to various embodiments of the present disclosure. For example, this may be an example of the graphic guide material when 3D scan photographing of FIG. 16 is executed.

Referring to FIG. 17, an example of the graphic guide material is displayed while performing a 3D scan photograph as described above with reference to FIG. 16. The graphic guide material may include a thumbnail window 1700 that generates a thumbnail image associated with a photographed image(s) and an image obtained by connecting the images, and appropriately displays a subsequent photographing area in the thumbnail image. A thumbnail image associated with a currently photographed image may be displayed in the thumbnail window 1700, and a part that is a target of current photographing may be expressed as a darker area (e.g., a part of the thumbnail window filled with an oblique hatching pattern).

As a graphic guide material that displays distortion or motion blur of a currently input image or the like, together with displaying the thumbnail window 1700a first guide material 1710 (a bold solid-line box) provided in a box shape may be displayed. The graphic guide material that displays a location for subsequent photographing (i.e., a location of an image to be photographed in a subsequent order or a photographing direction in a subsequent order), to guide the photographing operation by displaying a second guide material 1720 (a broken line box) provided in a box shape. Also, additional graphic guide material may be displayed that guides a photographing direction to a subsequent photographing location, such as an arrow 1705 or the like. The graphic guide material may be configured to generate a vibration or a sound to indicate a current photographing state (distortion, motion blur or the like), in addition to the above described graphic guide material.

Figure 18:
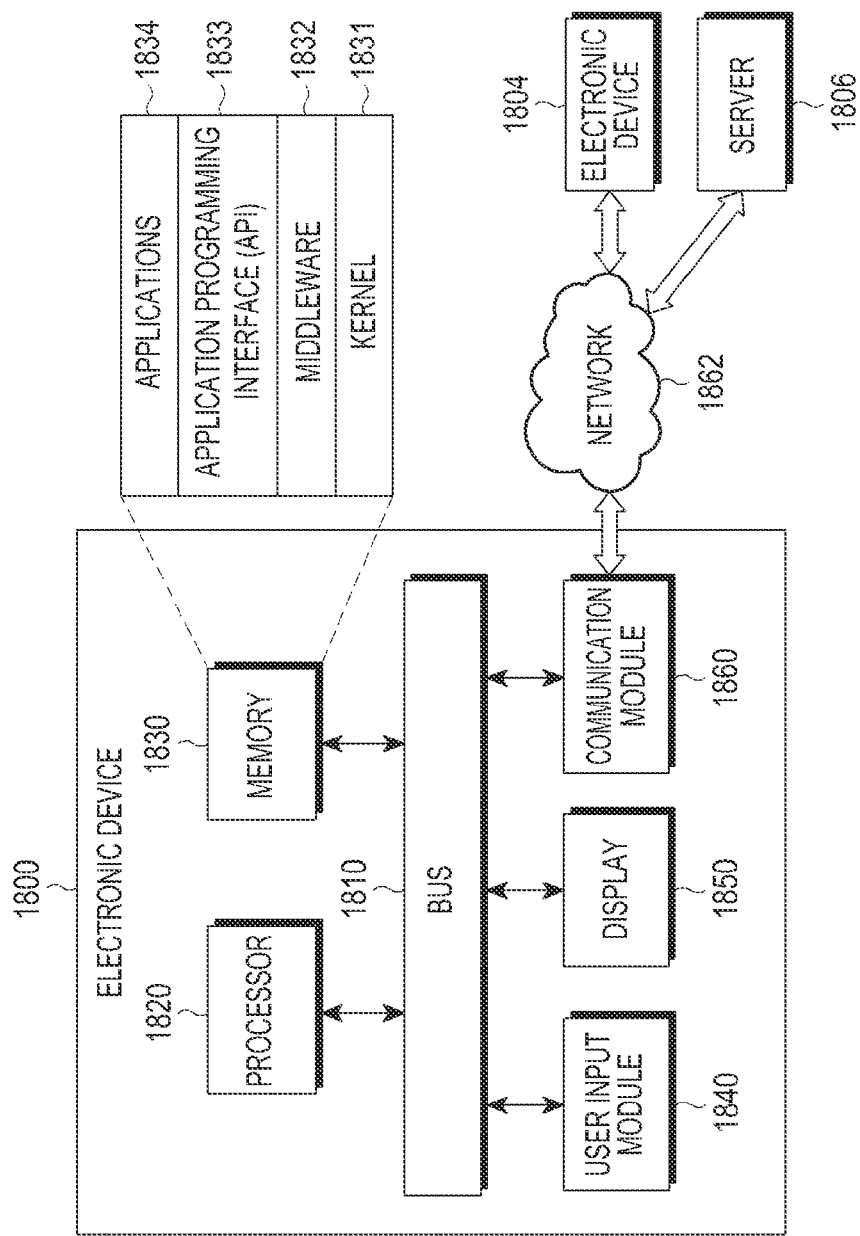
FIG. 18 is a block diagram of an electronic device and a network environment according to various embodiments of the present disclosure.

FIG. 18 is a block diagram of an electronic device and a network environment according to various embodiments of the present disclosure.

Referring to FIG. 18, an electronic device 1800 may include a bus 1810, a processor 1820, a memory 1830, a user input module 1840, a display 1850, or a communication module 1860.

The bus 1810 may be a circuit that connects the aforementioned elements and transfers communication (for example, a control messages) between the aforementioned elements.

The processor 1820 may receive instructions from other elements (for example, the memory 1830, the user input module 1840, the display 1850, and the communication module 1860) through, for example, the bus 1810, decipher the received instructions, and perform calculation or data processing according to the deciphered instructions.

The memory 1830 may store instructions or data which are received from the processor 1820 or other elements (for example, the user input module 1840, the display 1850, and the communication module 1860) or created by the processor 1820 or other elements. The memory 1830 may include programming modules such as a kernel 1831, a middleware 1832, an application programming interface (API) 1833, applications 1834 or the like. The aforementioned programming modules may be implemented by software, firmware, hardware, or a combination of at least two thereof.

The kernel 1831 may control or manage system resources (for example, the bus 1810, the processor 1820, the memory 1830, or the like) that are used to perform operations or functions implemented in the remaining programming modules, for example, the middleware 1832, the API 1833, and the applications 1834. Further, the kernel 1831 may provide interfaces by which the middleware 1832, the API 1833 or the application 1834 may access each element of the electronic device 1800 to control or manage them.

The middleware 1832 may play an intermediate role between the API 1833 or the application 1834 and the kernel 1831 to communicate with each other for transmission and reception of data. Furthermore, in regard to task requests received from the plurality of applications 1834, the middleware 1832 may perform load balancing for the task requests using, for example, a method of assigning a priority for using the system resources (for example, the bus 1810, the processor 1820, the memory 1830, or the like) to at least one of the plurality of applications 1834.

The API 1833 is an interface by which the application 1834 controls a function provided by the kernel 1831 or the middleware 1832, and may include, for example, at least one interface or function for a file control, a window control, image processing, or a text control.

For example, the user input module 1840 may receive an instruction or data from the user and transmit the instruction or the data to the processor 1820 or the memory 1830 through the bus 1810. The display 1850 may display an image, a video, or data to a user.

The communication module 1860 may connect communication between another electronic device 1804 and the electronic device 1800. The communication module 1860 may support a short range communication protocol (for example, wireless fidelity (Wi-Fi), bluetooth (BT), or near field communication (NFC)) or network communication 1862 (for example, the Internet, a local area network (LAN), a wire area network (WAN), a telecommunication network, a cellular network, a satellite network, a plain old telephone service (POTS), or the like). The electronic device 1804 may be the same (for example, the same type of) device as the electronic device 1800 or a different (for example, a different type of) device from the electronic device 1800.

Figure 19:
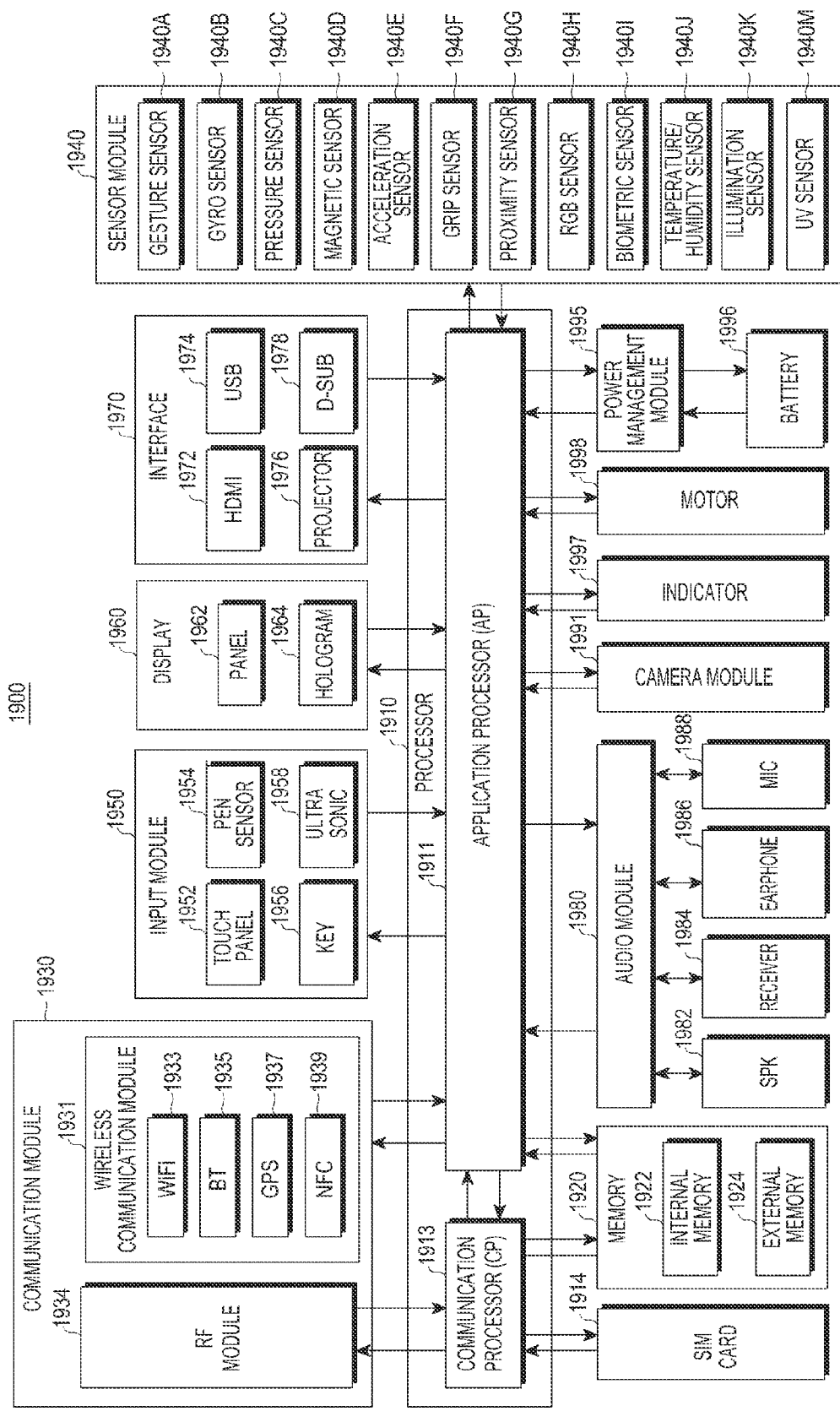
FIG. 19 is a detailed block diagram of an electronic device according to various embodiments of the present disclosure.

FIG. 19 is a block diagram illustrating a hardware device 1900 according to various embodiments.

Referring to FIG. 19, the hardware device 1900 may be an implementation of the electronic device 1800 in FIG. 18. The hardware device 1900 may include at least one processor 1910, a subscriber identification module (SIM) card 1914, a memory 1920, a communication module 1930, a sensor module 1940, a user input module 1950, a display 1960, an interface 1970, an audio module 1980, camera module 1991, a power management module 1995, a battery 1996, an indicator 1997, and a motor 1998.

The processor 1910 (for example, the processor 1820) may include one or more application processors (APs) 1911 or one or more communication processors (CPs) 1913. The processor 1910 may be, for example, the processor 1820 of FIG. 18. Although the AP 1911 and the CP 1913 are included in the processor 1910 in FIG. 19, the AP 1911 and the CP 1913 may be included in different integrated circuit (IC) packages, respectively. According to an embodiment of the present disclosure, the AP 1911 and the CP 1913 may be included in one IC package.

The AP 1911 may drive an operating system or an application program to control hardware or software component elements connected with the AP 1911, and process and calculate various data including multimedia data. The AP 1911 may be embodied as, for example, a system on chip (SoC). According to an embodiment of the present disclosure, the processor 1910 may further include a graphics processing unit (GPU) (not illustrated).

The CP 1913 may perform a function of managing data links and converting communication protocols to communicate between an electronic device (for example, the hardware device 1900) and other electronic devices connected over a network. The CP 1913 may be embodied as, for example, an SoC. According to an embodiment of the present disclosure, the CP 1913 may perform some multimedia control functions. The CP 1913 may identify and authenticate electronic devices in a communication network using, for example, a SIM (for example, the SIM card 1914). In addition, the CP 1913 may provide a user with services such as voice calls, video calls, text messages, packet data, or the like.

Further, the CP 1913 may control transmission and reception of data of the communication module 1930. Although the elements such as the CP 1913, the power management unit 1995, and the memory 1920 are illustrated as separate entities from the AP 211 in FIG. 19, the AP 1911 may be implemented to include at least some (for example, the CP 1913) of the aforementioned elements according to one embodiment of the present disclosure.

According to an embodiment of the present disclosure, the AP 1911 or the CP 1913 may load instructions or data, which are received from at least one of a non-volatile memory or other component elements connected with the AP 1911 or the CP 1913, to a volatile memory and process the same. In addition, the AP 1911 or the CP 1913 may store data in a non-volatile memory that is received from or generated by at least one of the other component elements.

The SIM card 1914 may be a subscriber identification module and may be inserted into a slot formed in a predetermined portion of an electronic device. The SIM card 1914 may include unique identification information (for example, an integrated circuit card identifier (ICCID)) or subscriber information (for example, an international mobile subscriber identity (IMSI)).

The memory 1920 may include an embedded memory 1922 or an external memory 1924. The memory 1920 may be, for example, the memory 1830 of FIG. 18. The internal memory 1922 may include at least one of a volatile memory (for example, a dynamic random access memory (DRAM), a static RAM (SRAM), a synchronous DRAM (SDRAM), and the like) and a non-volatile memory (for example, a one time programmable read only memory (OTPROM), a PROM, an erasable and programmable ROM (EPROM), an electrically EPROM (EEPROM), a mask ROM, a flash ROM, a not and (NAND) flash memory, a not or (NOR) flash memory, and the like). According to an embodiment of the present disclosure, the embedded memory 1922 may be in a form of a solid-state drive (SSD). The external memory 1924 may further include a flash drive, for example, a compact flash (CF), a secure digital (SD), a micro-SD, a mini-SD, an extreme digital (xD), a memory stick, or the like.

The communication module 1930 may include a wireless communication module 1931 or a radio frequency (RF) module 1934. The communication module 1930 may be, for example, the communication module 1860 of FIG. 18. The wireless communication module 1931 may include, for example, Wi-Fi module 1933, BT module 1935, a GPS module 1937, or a NFC module 1939. Additionally and alternatively, the wireless communication module 1931 may include a network interface (for example, a LAN card) or a modem in order to connect the hardware device 1900 with a network (for example, the Internet, a LAN, a WAN, a telecommunication network, a cellular network, a satellite network, a POTS, or the like).

The RF module 1934 may perform transmission and reception of data, for example, RF signals or other electromagnetic signals. Although not illustrated, the RF module 1934 may include, for example, a transceiver, a power amp module (PAM), a frequency filter, a low noise amplifier (LNA), and the like. Also, the RF module 1934 may further include components, for example, a conductor or a cable for transmitting and receiving electromagnetic waves through free space.

The sensor module 1940 may include at least one of, for example, a gesture sensor 1940A, a gyro-sensor 1940B, an atmospheric pressure sensor 1940C, a magnetic sensor 1940D, an acceleration sensor 1940E, a grip sensor 1940F, a proximity sensor 1940G, a red-green-blue (RGB) sensor 1940H, a biometric sensor 1940I, a temperature/humidity sensor 1940J, an illumination sensor 1940K, and an ultraviolet (UV) sensor 1940M. The sensor module 1940 may measure physical quantities or sense an operation state of an electronic device to convert the measured or sensed information to electric signals. Additionally/alternatively, the sensor module 1940 may include, for example, an E-nose sensor (not illustrated), an electromyography (EMG) sensor (not illustrated), an electroencephalogram (EEG) sensor (not illustrated), an electrocardiogram (ECG) sensor (not illustrated), a fingerprint sensor, and the like. The sensor module 1940 may further include a control circuit for controlling at least one sensor included in the sensor module 1940.

The user input module 1950 may include a touch panel 1952, a (digital) pen sensor 1954, a key 1956, or an ultrasonic input device 1958. The user input module 1950 may be, for example, the user input module 1840 illustrated in FIG. 18. The touch panel 1952 may recognize a touch input through at least one of, for example, a capacitive type, a resistive type, an infrared type, and an ultrasonic type. In addition, the touch panel 1952 may further include a controller (not shown). The capacitive type touch panel may execute proximity recognition in addition to recognizing a direct touch. The touch panel 1952 may further include a tactile layer. In this case, the touch panel 1952 may provide a tactile reaction to a user.

The (digital) pen sensor 1954 may be implemented, for example, using a method that is similar or identical to receiving a user's touch input, or using a separate recognition sheet. The key 1956 may be implemented by, for example, a keypad or a touch key. The ultrasonic input device 1958 may generate an ultrasonic wave signal through a pen and may identify data by detecting a sound wave using a microphone (for example, a microphone 1988) in the electronic device. According to one embodiment of the present disclosure, the hardware device 1900 may also receive a user input from an external device (for example, a network, a computer, or the server 106) connected with the external device, using the communication module 1930.

The display module 1960 may include a panel 1962 or a hologram 1964. The display 1960 may be, for example, the display 1850 illustrated in FIG. 18. The panel 1962 may be, for example, a liquid crystal display (LCD), an active-matrix organic light emitting diode (AM-OLED), or the like. The panel 1962 may be implemented to be, for example, flexible, transparent, or wearable. The panel 1962 may also be configured as one module integrated with the touch panel 1952. The hologram 1964 may display 3D images in the air by using interference of light. According to an embodiment of the present disclosure, the display module 1960 may further include a control circuit for controlling the panel 1962 or the hologram 1964.

The interface 1970 may include, for example, a high-definition multimedia interface (HDMI) 1972, a universal serial bus (USB) 1974, a projector 1976, or a D-subminiature (D-sub) 1978. Additionally or alternatively, the interface 1970 may include, for example, a SD/multimedia card (MMC) (not illustrated) or an infrared data association (IrDA) (not illustrated).

The audio module 1980 may convert voices to electric signals, and vice versa. The audio module 1980 may convert voice information input or output through, for example, a speaker 1982, a receiver 1984, an earphone 1986, the microphone 1988, or the like.

The camera module 1991 is for photographing an image and a video. According to an embodiment of the present disclosure, the camera module 1991 may include one or more image sensors (for example, a front lens or a back lens), an image signal processor (ISP) (not illustrated) or a flash LED (not illustrated).

The power management module 1995 may manage power of the hardware device 1900. Although not illustrated, the power managing module 1995 may include, for example, a power management integrated circuit (PMIC), a charger IC, or a battery fuel gauge.

The PMIC may be mounted, for example, in integrated circuits or SoC semiconductors. The charging methods may be classified into wired charging and wireless charging. The charger IC may charge a battery and prevent inflow of over voltage or over current from a charger. According to an embodiment of the present disclosure, the charger IC may include a charger IC for at least one of the wired charging method and the wireless charging method. The wireless charging method may include a magnetic resonance scheme, a magnetic induction scheme, or an electromagnetic scheme, and an additional circuit for wireless charging, such as a coil loop circuit, a resonance circuit, a rectifier circuit, and the like may be added.

The battery gauge may measure, for example, the residual quantity of the battery 1996, a charging voltage and current, or temperature. The battery 1996 may generate and supply power, and may be, for example, a rechargeable battery.

The indicator 1997 may display a predetermined state, for example, a booting state, a message state, or a charging state, of the hardware device 1900 or some of the hardware device 1900 (for example, the AP 1911). The motor 1998 may convert an electric signal into a mechanical vibration.

Although not illustrated, the hardware device 1900 may include a processing device (for example, a GPU) for supporting mobile TV. The processing device for supporting mobile TV may process media data according to standards, for example, a digital multimedia broadcasting (DMB), a digital video broadcasting (DVB), a media flow, or the like.

Each of the above-described component elements of hardware according to the present disclosure may be configured with one or more components, and the names of the corresponding component elements may vary based on the type of electronic device. The hardware 1900 according to an embodiment of the present disclosure may include at least one of the above-described elements. Some of the above-described elements may be omitted from the hardware 1900, or the hardware 1900 may further include additional elements. Also, some of the elements of the electronic device according to the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific IC (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the instruction is performed by at least one processor (for example, the processor 1910), the at least one processor may perform a function corresponding to the instruction. The computer-readable storage medium may be, for example, the memory 1920. At least a part of the programming module may, for example, be implemented (e.g., executed) by the processor 1910. At least a part of the programming module may, for example, include a module, a program, a routine, a set of instructions, or a process for performing at least one function.

The computer readable recording medium may include magnetic media such as a hard disc, a floppy disc, and a magnetic tape, optical media such as a compact disc ROM (CD-ROM) and a DVD, magneto-optical media such as a floptical disk, and hardware devices specifically configured to store and execute program commands, such as a ROM, a RAM, and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Various embodiments of the present disclosure provided in the present specifications and drawings are merely certain examples to readily describe the technology associated with various embodiments of the present disclosure and to help understanding of various embodiments of the present disclosure, but may not limit the scope of various embodiments of the present disclosure. Therefore, in addition to various embodiments disclosed herein, the scope of the various embodiments of the present disclosure should be construed to include all modifications or modified forms drawn based on the technical idea of the various embodiments of the present disclosure.

It will be appreciated that various embodiments of the present disclosure may be implemented in a form of hardware, software, a combination of hardware and software. Regardless of being erasable or re-recordable, such an optional software may be stored in a non-volatile storage device such as a ROM, a memory such as an RAM, a memory chip, a memory device, or an integrated circuit, or a storage medium such as a CD, a DVD, a magnetic disc, or a magnetic tape that is optically or electromagnetically recordable and readable by a machine, for example, a computer. It can be also appreciated that the memory included in the portable terminal is one example of machine-readable devices suitable for storing a program including instructions that are executed by a processor device to thereby implement embodiments of the present disclosure. Accordingly, the present disclosure includes a program that includes a code for implementing an apparatus or a method defined and a machine-readable storage medium that stores such a program. Further, the program may be electronically carried by a transitory medium such as a communication signal transferred through a wired or wireless connection, and the present disclosure appropriately includes equivalents thereof.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A photographing method comprising:
   photographing, by an electronic device, a plurality of images through a camera which is functionally connected to the electronic device;
   providing a photographing guide having a guide material associated with a validity of at least one photographed image during the photographing of the plurality of images;
   displaying, on a display which is functionally connected to the electronic device, a thumbnail window that displays a thumbnail image associated with the at least one photographed image based on a relative location of the at least one photographed image in an entire photographing scope;
   displaying the guide material that indicates a state of a currently input image, in association with the thumbnail window; and
   generating a single image using the at least one photographed image,
   wherein the guide material is provided in a box shape having a size corresponding to at least one distorted part associated with the currently input image.

2. The method of claim 1, wherein the providing of the photographing guide comprises:
   determining the validity based on a degree of motion blur or a degree of distortion of at least one another photographed image with respect to the at least one photographed image.

3. The method of claim 2,
   wherein the photographing guide further includes a message,
   wherein the message or the guide material includes information associated with the degree of motion blur or the degree of distortion, and
   wherein the photographing guide is displayed through the display which is functionally connected to the electronic device.

4. The method of claim 3, wherein the providing of the photographing guide further comprises:
   providing a message indicating re-photographing or termination of photographing, in association with the photographing guide, based on a determination whether the degree of motion blur or the degree of distortion is greater than or equal to a predetermined value.

5. The method of claim 3, wherein the providing of the photographing guide further comprises:
   reporting a state associated with the degree of motion blur or the degree of distortion, through a predetermined vibration or sound.

6. The method of claim 1, wherein the photographing of the plurality of images comprises:
   executing photographing by moving from an original photographing point in a first direction; and
   executing photographing by moving in a second direction that is opposite to the first direction.

7. The method of claim 6, wherein the executing of the photographing by moving in the second direction comprises:
   photographing at least one image multiple times at a location where photographing is already executed;
   comparing the at least one photographed image and the at least one photographed image obtained through multiple times of photographing; and
   selecting one of the at least one photographed image and the at least one photographed image obtained through multiple times of photographing, based on a result of comparison between the at least one photographed image and the at least one photographed image obtained through multiple times of photographing.

8. The method of claim 1, wherein the photographing is executed by three dimensional (3D) scan photographing.

9. The method of claim 1, wherein the photographing of the at least one image is executed by panoramic photographing.

10. The method of claim 9, wherein the photographing of the at least one image comprises:
    setting a mode of the panoramic photographing to a burst shot mode or a capture mode based on an ambient environment of the electronic device.

11. The method of claim 1, wherein the displaying of the guide material comprises:
    displaying another guide material to indicate a subsequent location for photographing, in association with displaying the thumbnail window.

12. An electronic device, comprising:
    at least one processor configured to:
      analyze a plurality of images photographed through a camera which is functionally connected to the electronic device, and
      provide a photographing guide having a guide material associated with a validity of at least one photographed image during the photographing of the plurality of images; and
    a display configured to:
      display a thumbnail window that displays a thumbnail image associated with the at least one photographed image based on a relative location of the at least one photographed image in an entire photographing scope based on a control of the at least one processor, and
      display the guide material that indicates a state of a currently input image, in association with the thumbnail window,
    wherein the guide material is provided in a box shape having a size corresponding to at least one distorted part associated with the currently input image.

13. The electronic device of claim 12, further comprising:
    a movement sensor configured to sense a movement of the camera,
    wherein the at least one processor is further configured to determine whether photographing is executed to correspond to movement of the camera based on the movement sensor.

14. The electronic device of claim 12, wherein the validity of the at least one photographed image is determined based on a degree of motion blur or a degree of distortion of at least one another photographed image with respect to the at least one photographed image.

15. The electronic device of claim 14,
    wherein the photographing guide further includes a message, wherein the message or the guide material includes information associated with the degree of motion blur or the degree of distortion, and wherein the photographing guide is displayed through the display which is functionally connected to the electronic device.

16. The electronic device of claim 15, wherein the photographing guide is configured to report a state associated with the degree of motion blur or the degree of distortion, through a predetermined vibration or sound.

17. The electronic device of claim 12, wherein the guide material includes another guide material to indicate a subsequent location for photographing, in association with displaying the thumbnail window.

18. The electronic device of claim 12, wherein the camera is configured to execute three dimensional (3D) scan photographing.

19. The electronic device of claim 12, wherein the camera is configured to execute panoramic photographing.

* * * * *